US011061376B2

(12) United States Patent
Holleran et al.

(10) Patent No.: US 11,061,376 B2
(45) Date of Patent: Jul. 13, 2021

(54) METHODS AND SYSTEM FOR REDUCING ENERGY USE IN BUILDINGS

(71) Applicant: Mariner Partners Inc., Saint John (CA)

(72) Inventors: Charles L. Holleran, Saint John (CA); Andrea Curry, Saint John (CA); Dan O'Connor, Saint John (CA); Tim Aske, Saint John (CA); Gary Ogden, Quispamsis (CA); Brock Sansom, Bedford (CA)

(73) Assignee: Mariner Partners Inc., St. John (CA)

( * ) Notice: Subject to any disclaimer, the term of this patent is extended or adjusted under 35 U.S.C. 154(b) by 0 days.

(21) Appl. No.: 16/380,385

(22) Filed: Apr. 10, 2019

(65) Prior Publication Data
US 2019/0235459 A1 Aug. 1, 2019

Related U.S. Application Data

(63) Continuation of application No. 15/314,608, filed as application No. PCT/CA2015/050483 on May 28, 2015, now Pat. No. 10,338,559.
(Continued)

(51) Int. Cl.
*G05B 19/048* (2006.01)
*G06Q 50/06* (2012.01)
(Continued)

(52) U.S. Cl.
CPC ........ *G05B 19/048* (2013.01); *F24F 11/0001* (2013.01); *F24F 11/30* (2018.01);
(Continued)

(58) Field of Classification Search
CPC .............. G05B 19/048; H04L 12/2821; H04L 12/2823; H04L 67/12
See application file for complete search history.

(56) References Cited

U.S. PATENT DOCUMENTS 10,338,559 B2 * 7/2019 Holleran ................. H04L 12/66
2005/0096797 A1 * 5/2005 Matsubara ................ H02J 3/00
700/291
(Continued)

OTHER PUBLICATIONS

The International Bureau of WIPO, International Report on Patentability and Written Opinion of the International Searching Authority dated Nov. 29, 2016.
(Continued)

*Primary Examiner* — Vincent H Tran
(74) *Attorney, Agent, or Firm* — Ridout & Maybee LLP

(57) ABSTRACT

The present disclosure provides systems and methods for reducing energy use in buildings. A data centre receives source data from one or more building systems and/or one or more external sources. A plurality of energy optimization strategies are applied to at least a subset of the source data to determine a set of proposed output values for each energy optimization strategy, independently of each other, wherein each set of proposed output values includes at least one equipment set point. Conflicts between the sets of proposed output values are resolved, to generate a set of harmonized output values. The set of harmonized output values is transmitted to the one or more building control systems through one or more gateway devices.

20 Claims, 13 Drawing Sheets

Related U.S. Application Data

(60) Provisional application No. 62/004,581, filed on May 29, 2014, provisional application No. 62/120,147, filed on Feb. 24, 2015.

(51) Int. Cl.
| | |
|---|---|
| *H02J 13/00* | (2006.01) |
| *H04L 12/28* | (2006.01) |
| *H04L 29/08* | (2006.01) |
| *F24F 11/62* | (2018.01) |
| *F24F 11/30* | (2018.01) |
| *F24F 11/00* | (2018.01) |
| *H04L 12/66* | (2006.01) |
| *H04L 12/26* | (2006.01) |
| *F24F 11/46* | (2018.01) |

(52) U.S. Cl.
CPC ............. *F24F 11/62* (2018.01); *G06Q 50/06* (2013.01); *H02J 13/00* (2013.01); *H04L 12/2821* (2013.01); *H04L 12/2823* (2013.01); *H04L 12/66* (2013.01); *H04L 43/0811* (2013.01); *H04L 67/12* (2013.01); *H04L 67/125* (2013.01); *F24F 11/46* (2018.01); *F24F 2011/0002* (2013.01); *G05B 2219/2614* (2013.01); *G05B 2219/2642* (2013.01); *Y02B 70/30* (2013.01); *Y04S 20/20* (2013.01); *Y04S 40/18* (2018.05)

(56) References Cited

U.S. PATENT DOCUMENTS

| | | |
|---|---|---|
| 2008/0046387 A1 | 2/2008 | Gopal |
| 2010/0262298 A1 | 10/2010 | Johnson |
| 2010/0283606 A1 | 11/2010 | Tsypin et al. |
| 2011/0047298 A1* | 2/2011 | Eaton .................... A61B 5/0002 710/8 |
| 2011/0140896 A1 | 6/2011 | Menzel |
| 2011/0168793 A1 | 7/2011 | Kreft et al. |
| 2011/0238223 A1 | 9/2011 | Narayanamurthy |
| 2011/0307112 A1 | 12/2011 | Barrilleaux |
| 2012/0123594 A1* | 5/2012 | Finch .................. G05D 23/1923 700/278 |
| 2012/0143567 A1* | 6/2012 | Fourie .................... C09D 5/004 702/184 |
| 2012/0232701 A1* | 9/2012 | Carty ...................... G05B 15/02 700/277 |
| 2013/0085614 A1 | 4/2013 | Wenzel |
| 2013/0304269 A1* | 11/2013 | Shiel ...................... G06Q 50/06 700/291 |
| 2014/0052305 A1 | 2/2014 | Kearns et al. |
| 2014/0067145 A1 | 3/2014 | Shu |
| 2014/0214220 A1* | 7/2014 | Kamel .................... G06Q 10/06 700/291 |
| 2015/0325096 A1* | 11/2015 | Hatch .................... E05F 15/71 340/601 |

OTHER PUBLICATIONS

Canadian Intellectual Property Office, International Search Report dated Jul. 15, 2015.

\* cited by examiner

METHODS AND SYSTEM FOR REDUCING ENERGY USE IN BUILDINGS

RELATED APPLICATIONS

This application is a continuation of U.S. patent application Ser. No. 15/314,608; which is the National Stage of International Application No. PCT/CA2015/050483, filed May 28, 2015; which claims the benefit of and priority to U.S. Provisional Application No. 62/004,581, filed on May 29, 2014; also claims the benefit of and priority to U.S. Provisional Application No. 62/120,147, filed on Feb. 24, 2015; the contents of which are all hereby incorporated by reference as if recited in full herein for all purposes.

TECHNICAL FIELD

The present disclosure relates generally to methods and systems for reducing energy use in buildings and other closed boundary environments.

BACKGROUND

A building is a closed boundary system. The purpose of a building is to provide shelter and services, such as a comfortable space, fresh air, water, and lighting. The degree to which these services are needed depends on the use and occupancy of the spaces in the building. Increasing amounts of energy cannot be stored inside the building without internal temperatures rising. If the temperatures inside the building are consistent over a day, then the net energy entering or leaving the building's closed system boundary over the 24 hour period is always zero. When more energy is put into a building than it needs, the excess energy must be rejected outside the building. Typically this is in the form of heat rejected on the roof a building.

Energy is fed into the building through electrical and natural gas flow. Other utilities may also be purchased and may enter the building, such as oil, propane, steam, chilled water, and domestic water. Each of these utilities provides an energy flow into and sometimes back out of the building. Due to a temperature difference between the inside of a building and the outside, there is always a flow of heat energy across the building shell. There is a great quantity of energy that is rejected from the building via cooling towers on the rooftop that reject the heat from inside the building to the external environment. The fresh air intake and exhausts—being at different temperatures than the outside air—are another energy flow across the building's system boundary. Over a 24 hour period, the net of all these energy flows in a building must be nearly zero or else the building is warmer or cooler from one day to the next.

When energy is purchased from a utility and enters the building, it may be converted from one form to another. For example, electrical energy may be converted to rotational mechanical energy and then again into heat. Due to the law of conservation of energy, this energy can never be used or consumed—only converted from one form to another. Therefore, due to the net zero energy constraint, every kWh of energy that is purchased and brought into the building must be rejected again from the building in the same day, perhaps in another form, such as heat. The energy is typically received through electrical cables and an equivalent amount of energy goes to the external environment at the same time.

As noted above, in order to provide the services in the building to the levels required by the operational needs, energy is converted from one form to another. For example, the energy used to pump water from the basement to the top of a tall building ensures that clean water service is provided at the top of the building at adequate pressure. However, when that water runs back down the drain to the basement it possesses all the same energy that was put in by the pump, now in the form of kinetic energy in the water flowing down the drain. In another example, when more electrical energy is put into a building or space than is rejected to the environment outside the system boundary, the net energy beyond what is leaving through the shell must be removed from the building through the cooling tower on the roof or else the building space will heat up past its operationally required temperature range.

The controls used to manage energy systems in buildings today do not and are incapable of using the net energy balance across closed system boundaries as a basis for reducing energy consumption. Accordingly, there is a need for a solution in which a building's systems are connected to a processing environment that does make energy balance calculations and manages existing equipment to achieve a reduced energy result.

SUMMARY

In some aspects, the present disclosure provides a system for reducing energy use in buildings that integrates with existing building systems to manage the building ecosystem and the equipment as it exists. The system may not need to rely on equipment upgrades to attain savings, but rather may ensure that existing equipment is fully exploited.

In such a system, one or more gateway devices connect the building systems to a data centre. The data centre comprises one or more databases that store data from the building, data derived from the raw building data, and/or data acquired from one or more external sources. The data centre also comprises one or more processors. The present disclosure will make reference to a processor in the singular, for simplicity, however it should be understood that such references to a single processor may be applicable to more than one processor. The gateway devices may be one or more computers or data connection appliances inside the building that are connected to the building's data sources by wired or wireless communication and are in wired or wireless communication with the data centre. The database stores a large number of values that are received by the data centre at regular time intervals, e.g., every minute. In a separate process in the data centre, the processor uses the values in the database to calculate and store derived values, to calculate and store output values for use in building systems wherein some of the instructions may include equipment set points, and to calculate and store values to be used in graphical user interfaces.

The calculations are performed by the processor using a number of energy optimization strategies such as for the purpose of improving occupant comfort and set point compliance, extending the life of the equipment, and/or reducing the total cost of energy used to operate the building, among other goals. Some of these energy optimization strategies may be based on a collection of non-building-specific strategies that generally reduce energy use in buildings. Some are unique to the individual building.

The calculations may be performed using static inputs, such as building use plans and equipment configurations, and/or dynamic inputs, such as weather forecasts and current utility rates. In some example embodiments, an advantage of the disclosure is that it makes optimization decisions based on total energy cost and not simply reduced consumption. The system measures effectiveness in dollars using actual utility price information.

A principle behind the energy optimization strategies is that energy is used for a purpose—otherwise, it is wasted and can be eliminated. There is a minimum amount of energy necessary to provide the services expected in a building. The energy of the building cannot be reduced below this amount, while any more than this amount is unnecessary waste.

In order to identify the minimum energy level necessary for the building, the system of the present disclosure determines the needs of the building by referring to a plan of how each space of the building will be used during certain time intervals, and other data from sensor(s) and/or system(s) in the building. For example, this plan may describe events that are scheduled to be held in the building on a particular day. Using preconfigured information about what are the space and equipment requirements for each of the event types, this use plan is translated into a set of space and equipment needs at the various times. Once the building needs are determined, services such as heating, cooling, fresh air, lighting, water, and plug power can be turned off or throttled back on, in anticipation of the scheduled events, to maintain the minimum energy level necessary to satisfy the building needs prior to and throughout the scheduled events. Conventional energy management systems, on the other hand, typically turn on equipment per a defined schedule, without awareness of actual space or equipment needs, without knowledge of whether actual space needs are met or exceeded at the time, and without anticipating future needs.

Another advantage of an example embodiment of the present disclosure is that it applies the energy optimization strategies in a harmonized way, resolving potential strategy conflicts to ensure all service needs are met using less energy. The harmonization is a driver of business value because it allows for multiple strategies to be employed in a single building. Without this harmonized approach, building energy may be difficult to manage effectively as individual strategies may conflict with one another and reduce the value of these strategies, or in some cases, cause the building to consume more energy than it would without any of the conflicting strategies.

In an example embodiment of the disclosure, one energy optimization strategy is a method of balancing the mix of fresh air intake and return air, wherein dry bulb temperature, wet bulb temperature, and dew point of fresh air, return air, desired supply air, and desired space air are considered and a mixture is used that requires the least amount of energy to produce the desired supply air temperature and humidity.

In an example embodiment of the disclosure, another energy optimization strategy is a method of coordinating the static pressures of zones in a building such that pressures may be reduced without adversely affecting the relative pressures of other zones. The method continually checks the static pressures, current trends, past history, wind speed and direction, and outdoor temperatures, making continuous adjustments to achieve the desired static pressures using a reduced or minimum amount of energy. Advantageously, this method avoids over- and under-pressurization, excess infiltration and exfiltration, and energy waste.

In an example embodiment of the disclosure, another energy optimization strategy is a method of automated self-repair that detects and corrects common issues that can be resolved by the building systems, yielding the advantage of more time for operator(s) to proactively address critical trouble spots, as well as identifying those critical trouble spots that cannot be addressed by the building systems alone.

In an example embodiment of the disclosure, another energy optimization strategy is a method of live detection and diagnostics that helps identify trouble spots sooner than simple alarm systems by detecting abnormal inputs to a building systems and signaling an alarm regarding the possibility of equipment failure, which may help to reduce or avoid unscheduled maintenance and energy waste, and may help to increase equipment life cycles.

BRIEF DESCRIPTION OF THE DRAWINGS

Reference will now be made, by way of example, to the accompanying drawings which show example embodiments of the present description, and in which.

DETAILED DESCRIPTION

Figure 1:
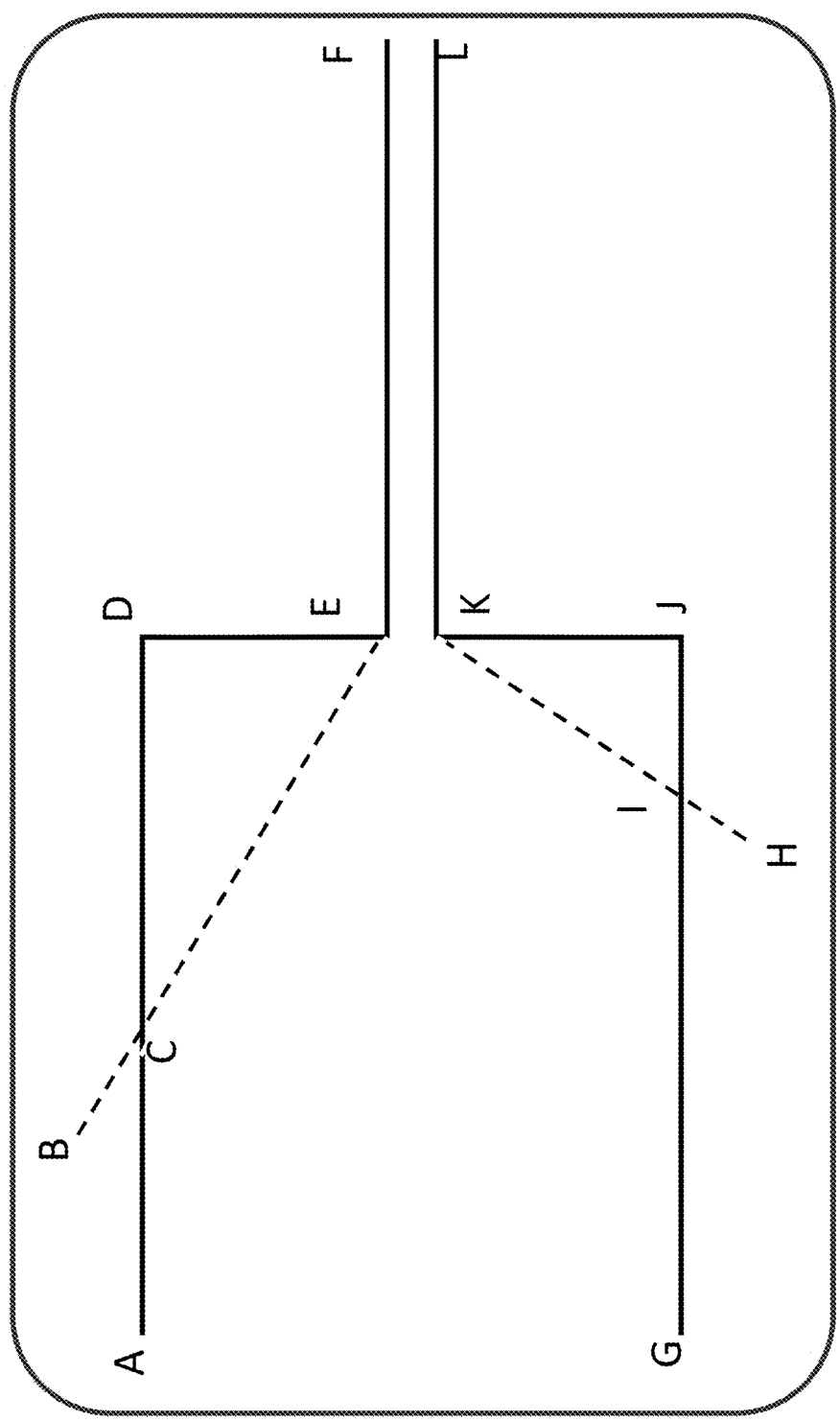
FIG. 1 shows a ramping methodology according to an example embodiment.

In one embodiment of the present disclosure, there is provided a system for reducing energy use in buildings. The system comprises one or more gateway devices and a data centre connected to one or more building systems of a building through the one or more gateway devices. The data centre comprises one or more databases and a processor, wherein the data centre receives source data from building systems (e.g., sensor, actuator, and/or equipment data, etc.) and/or from one or more external sources (e.g., weather data from Environment Canada, use schedules from Microsoft Outlook calendars, market energy prices from wholesale energy providers, etc.), and stores the source data in the one or more databases. The processor is configured to apply a plurality of energy optimization strategies to at least a subset of the source data to compute a set of output values, wherein at least part of the set of output values comprises equipment set points and wherein the processor is configured to resolve conflicts between the plurality of energy optimization strategies, and the data centre transmits the output values to the gateway devices that provide the values to one or more building systems.

The one or more gateway devices allow the system to integrate with existing building systems—e.g., SIEMENS, Honeywell, Johnson Controls, Trane, Douglas, etc.—through the use of building protocols such as Metasys, Apogee, BACnet, Modbus, LonTalk, Douglas MC-6000, etc. The system may not need to change or replace existing building systems, but rather may extract and control information from and to the building systems for improved space and energy performance. The system may be layered on top of one or more existing building systems and may not interfere with the existing manual control and emergency overrides.

The one or more gateway devices support integration with existing digital meters and sub-meters for real-time analytics, utility billing comparison, history, benchmarking, sustainability metrics and other reporting and optimization purposes, for example. Building sub-metering may include any sources, including energy generation equipment, combined heat and power, solar panels, etc.

In some examples, the disclosed system can support an entire building portfolio in a single instance. This may mean that disparate building types, like event centres, office buildings, arenas, recreation centres, shopping centers, and garages, may be supported by a single system and may be accessible for comparison and review in a single, access-controlled user interface.

The system enables optimization of various energy sources, including electricity, natural gas, water, oil, steam, chilled water, compressed air, and renewables, among others. The system may handle multiple rate and billing structures for each building. As an example, the system need not use a blended rate for $/kWh when in reality the building has two different blocks for electricity rates.

The processor of the system computes a set of outgoing values by performing calculations in accordance with and for each of the plurality of energy optimization strategies (described below), whether independently of each other or not, to produce one or more sets of proposed values. This is done using equipment configuration information, space and equipment requirements information, utility price information, historical data, weather information, and/or other information.

Figure 12:
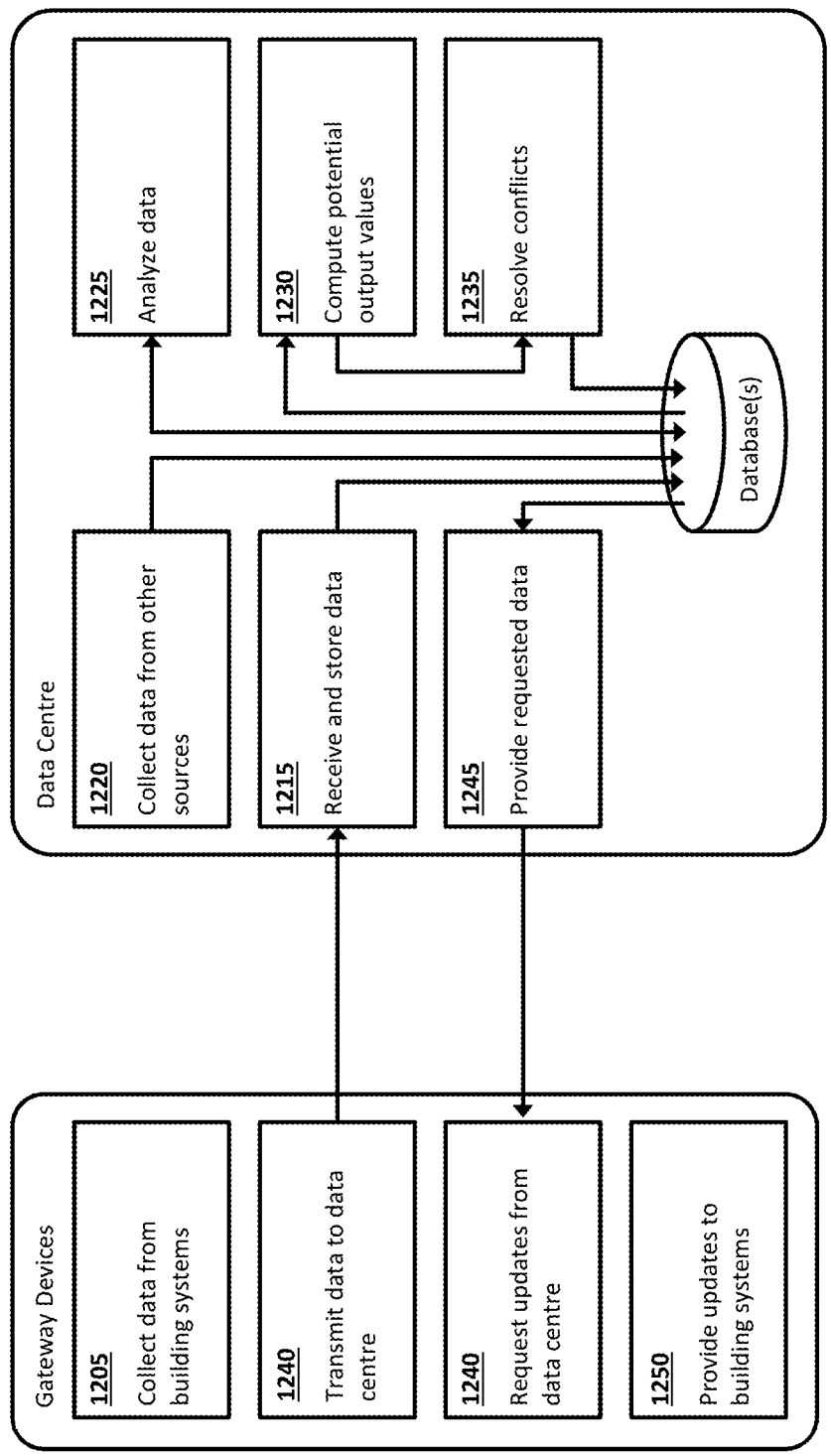
FIG. 12 shows top-level logic for reducing energy use in buildings according to example embodiments.

FIG. 12 shows an example embodiment of the top-level process of how outputs to the building systems are computed. At 1205, the gateway devices collect data from building systems, such as HVAC, chillers, boilers, lighting, security, elevators, water, etc. At 1210, the gateway devices transmit this data to the data centre. At 1215, the data centre receives this data and stores in the database(s). At 1220, the system collects data from other sources, such as weather data, and stores it in the database(s). At 1225, the system analyzes data from the database(s), computes further values in accordance with the optimization strategies, and stores them in the database(s). At 1230, the data centre computes potential output values. At 1235, the output values are tested for any conflicts, which are resolved and the resulting harmonized values are stored in the database(s). At 1240, the gateway devices request any updates to the output values. At 1245, the data centre provides the requested updated output values to the gateway devices. At 1250, the gateway devices provide these outputs to the appropriate building systems.

The testing for conflicts is done between output values and space or equipment requirements, between output values and equipment limits, and between output values from one optimization and any other output values. When multiple energy optimization strategies are applied in a building independently, sometimes they conflict with, or offset, each other. For example, if one optimization strategy turns down an air temperature, another may offset that by turning up a reheat coil elsewhere. Therefore, it is important to treat the building as behaving like an ecosystem—when something changes in one part of the ecosystem, other parts adjust to restore a balance.

Conflicts may be resolved in the following manner, for example: in an example scenario where two or more optimization strategies intend to change the same value of a particular device, if one simply takes priority then the value of the other is nullified. Instead, using the total ecosystem view, it is possible to determine what combination of the two has the best economic benefit for the whole building, for example by factoring in the real cost benefits of any proposed changes, including overall efficiency between the utility where the energy is purchased and the equipment, machine, device, or point at which the change is to be applied, and the real cost of that energy drawn from its utility using the actual cost structure of that utility.

Figure 13:
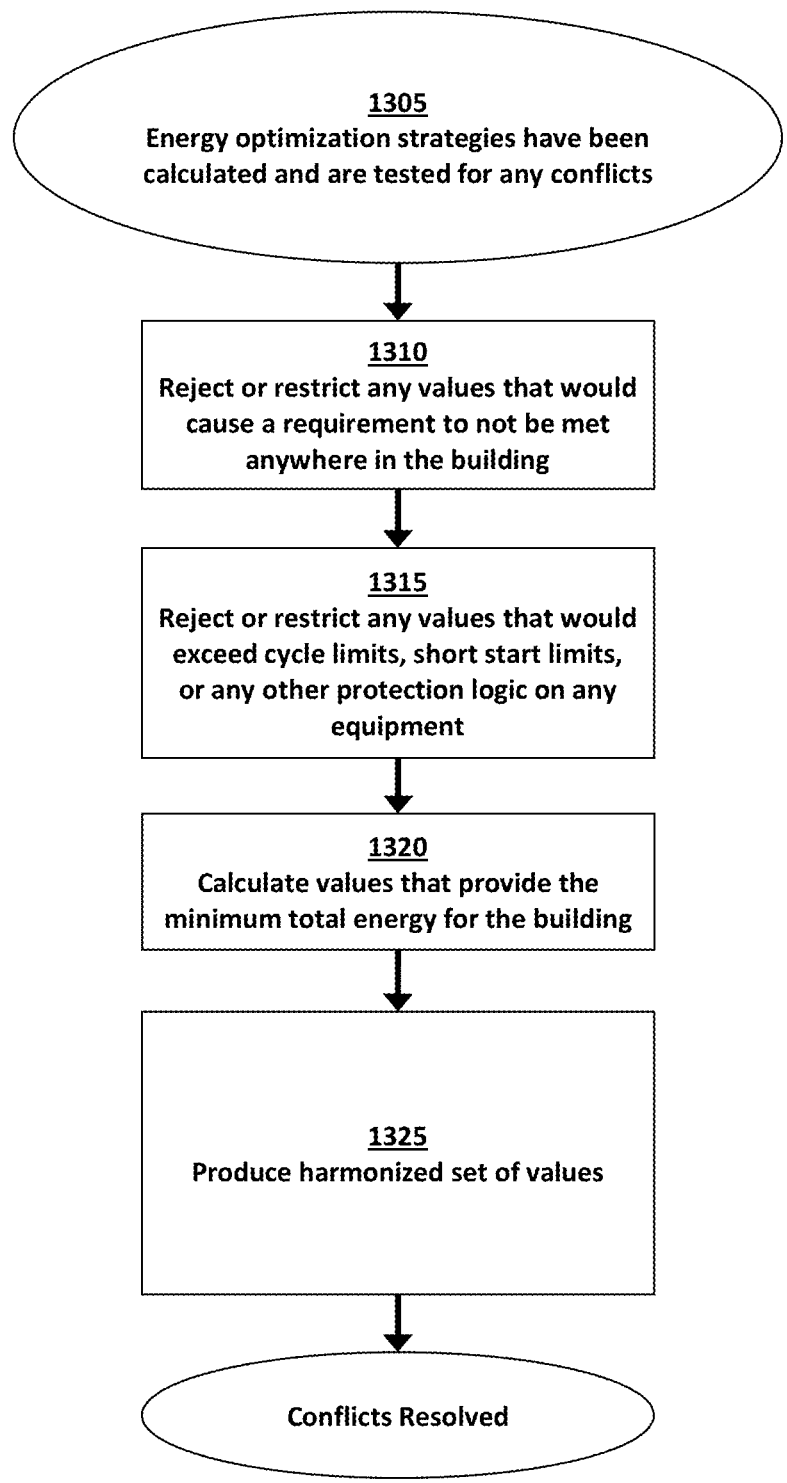
FIG. 13 is a flowchart that shows logic for harmonizing multiple energy optimization strategies according to an example embodiment.

FIG. 13 shows how the processor resolves conflicts, in accordance with an example embodiment. At 1305, all of the energy optimization strategies for a given time interval (e.g., one minute) have been executed but some of the values have conflicts. At 1310, the processor rejects all values, or bounds a potential output value to an acceptable range, where that potential output value would otherwise cause an operational requirement to not be met anywhere in the building. At 1315, the processor rejects all values, or bounds a potential output value to an acceptable range, where that potential output value would otherwise contravene the requirements or protection logic on any equipment in the building systems, such as by exceeding cycle limits, short start limits, etc. At 1320, the processor calculates the final set of output values that would provide the minimum total energy required for the building at the present time and at a future time using predicted energy performance. At 1325, the processor produces a harmonized set of output values. The harmonized set of output values may be a set of values that yields the least amount of energy that still meets the minimum total energy needs of the building, now and in the expected future. The conflicts may thus be resolved and the harmonized set of output values may be provided as output.

Figure 8:
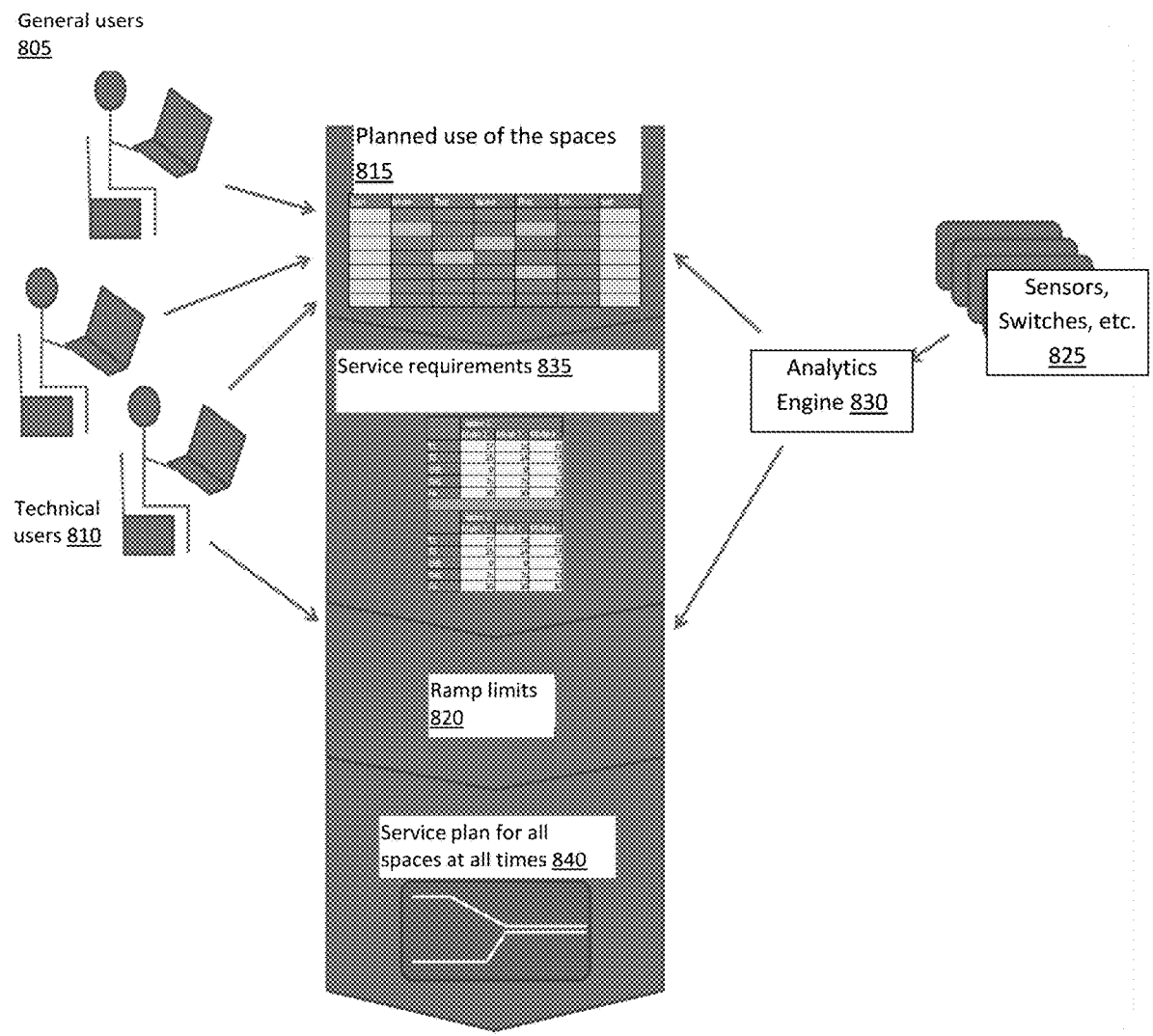
FIG. 8 illustrates an example service level determination system.

The output values that would provide the minimum total energy for a building may be calculated using weather observations, weather forecasts, current conditions in the building spaces and equipment, historical conditions in the building spaces and equipment, current and forecast building requirements, predefined space and equipment limits, static values from engineering analyses, and/or other such information. In an example embodiment, building requirements include upper and/or lower limits of a number of parameters of each space and equipment in the building, including upper and lower temperature limit, upper and lower humidity limit, and lower fresh air limit for each mode of operation of each space in the building, upper and lower supply air temperature and humidity limits, freeze protection lower limit, upper and lower fresh air limits, static pressure setpoints, and minimum supply and return fan on/off times for each air handler in the building, lower pressure limits, lower flow limits, and upper and lower water supply temperature limits for each water loop in the building, and others. The modes of the spaces in the example embodiment include "fully occupied", "unoccupied", "light occupancy", "idle", "startup", and "standby". The system uses a building use plan to provide accurate space requirements, where schedule information may be gathered from, for example, a user-defined building use plan, occupancy sensors, elevator actuation, building access activation, and/or other sources. The schedule information includes a specification of what mode each space is in now and in the future. The schedule and mode information is then combined with the matrix of building requirements for each mode in each space to generate a set of operating requirements for each space and any equipment requirements now and in the future, as illustrated in FIG. 8 (discussed further below). Rather than scheduling individual pieces of equipment, the system uses the building requirements derived from the use plan to determine what equipment mix is required to satisfy the requirements. Acceptable ranges of space requirements for each space are then employed to update what equipment needs to run at what degree/level/throttle to satisfy these requirements.

In some example embodiments, the data centre of the system for reducing energy use in buildings may be remotely located outside the building thereby providing access to adequate processing power and storage capacity to support the data volume and real-time algorithmic processing requirements of thousands of data points per minute for each building in a portfolio. The data centre may be accessed remotely via a web portal, VPN, etc.

In some examples, one of the plurality of energy optimization strategies may include a method where outdoor air can be used to cool the space inside a closed system boundary below the needs of the space in anticipation of a cooling need in the closed system boundary in the future, but not necessarily in that particular space, so that the coolness may be buffered and stored in the space ahead of the need of the overall system, forestalling mechanical cooling. In such an embodiment, a space, group of spaces, zone, group of zones, or a whole building has an upper and lower limit of the temperatures allowed in each space. With knowledge that the primary goal inside the system boundary is going to be cooling, it is possible to use relatively lower cost cooling by outside air to cool these spaces—not just to their target temperature—but to the lower limit of temperature allowed in each space at the given time, whether the individual space is expected to need cooling or not. This allows some buffering of coolness from a low cost source to offset the heat loads later, forestalling the need for mechanical cooling to keep the spaces below their upper temperature limit. It also avoids the impending exercise of cooling the spaces down to occupied limits by means of mechanical cooling, which is often done conventionally at the start of the day in many buildings. Unlike conventional systems, in some examples, the system of the present disclosure may facilitate storing coolness in a space inside the system boundary that is not going to need coolness later, and accessing that coolness later to help satisfy the needs of other spaces inside the system boundary. In an example embodiment, an air handler serves four rooms. One of the rooms is not expected to be occupied that day while the other three are. All four rooms are cooled to their lower limit, the fourth unoccupied room being cooled to its unoccupied lower limit, which is lower than that of the other rooms. When the cooling load increases later, the cooler air from the fourth room is mixed in with the other three in the return air supply, thereby offering some of its coolness to the other rooms.

Such a method can also be used to store coolness in spaces in advance of a rise in market price of electricity to again forestall some degree of mechanical cooling. In such an embodiment, an upcoming need is anticipated, adjustments are made to the building's systems to buffer energy from the most economical sources possible based on the predicted need, and subsequently, the stored energy is released at the opportune time.

In some examples, one of the plurality of energy optimization strategies is a method of using outdoor air to cool water in the water loop of a building in advance of a cooling need so that the coolness may be buffered and stored in the water ahead of the need, forestalling mechanical cooling. This is similar to the method discussed above, except that it is applied to a mass of water kept in loops, such as a chilled water loop that circulates through the building. In some cases the method involves circulating the loop water through areas exposed to cooler outdoor air when other infrastructure is not available.

In some examples, one of the plurality of energy optimization strategies is a method of reducing or eliminating unnecessary air circulation in air systems by turning down supply fan speed and adjusting the mixed air damper to maintain the required total fresh air volume, within the limits allowed for system operation. Return fan speed is correspondingly adjusted to maintain the desired air pressure. In particular, a monitoring system examines the air blown by a supply fan in an air handler and identifies the part of the total volume of air that is fresh air just taken into the building, and that which is the same air from the space that is recirculated back to the space again.

In some cases there is a benefit to the recirculation of some of the spaces' own air. However, this method allows a building to reduce the recirculation in cases where it is not all needed. The air at the inlet to the supply fan is a mix of fresh and return air, where the mix is controlled by the mixed air damper. The total flow through the supply fan is a function of the speed of the fan. The same volume of fresh air can be delivered at a lower fan speed by increasing the fresh air component of the mixed air. For example, a supply fan at 70% speed and 30% fresh air in the inlet mix has the same volume of fresh air as a fan at 30% speed and 70% fresh air, or again at 21% speed and 100% fresh air. In each case the volume of fresh air has not changed, but the volume of recirculated air becomes less. This can substantially reduce the energy needed to meet the fresh air requirements of the space. In order to maintain the same pressurization of the space, the method coordinates the reduction of the speed of the return fan. In all cases, the method ensures that all limits of spaces and systems are met while reducing the circulation.

Figure 7:
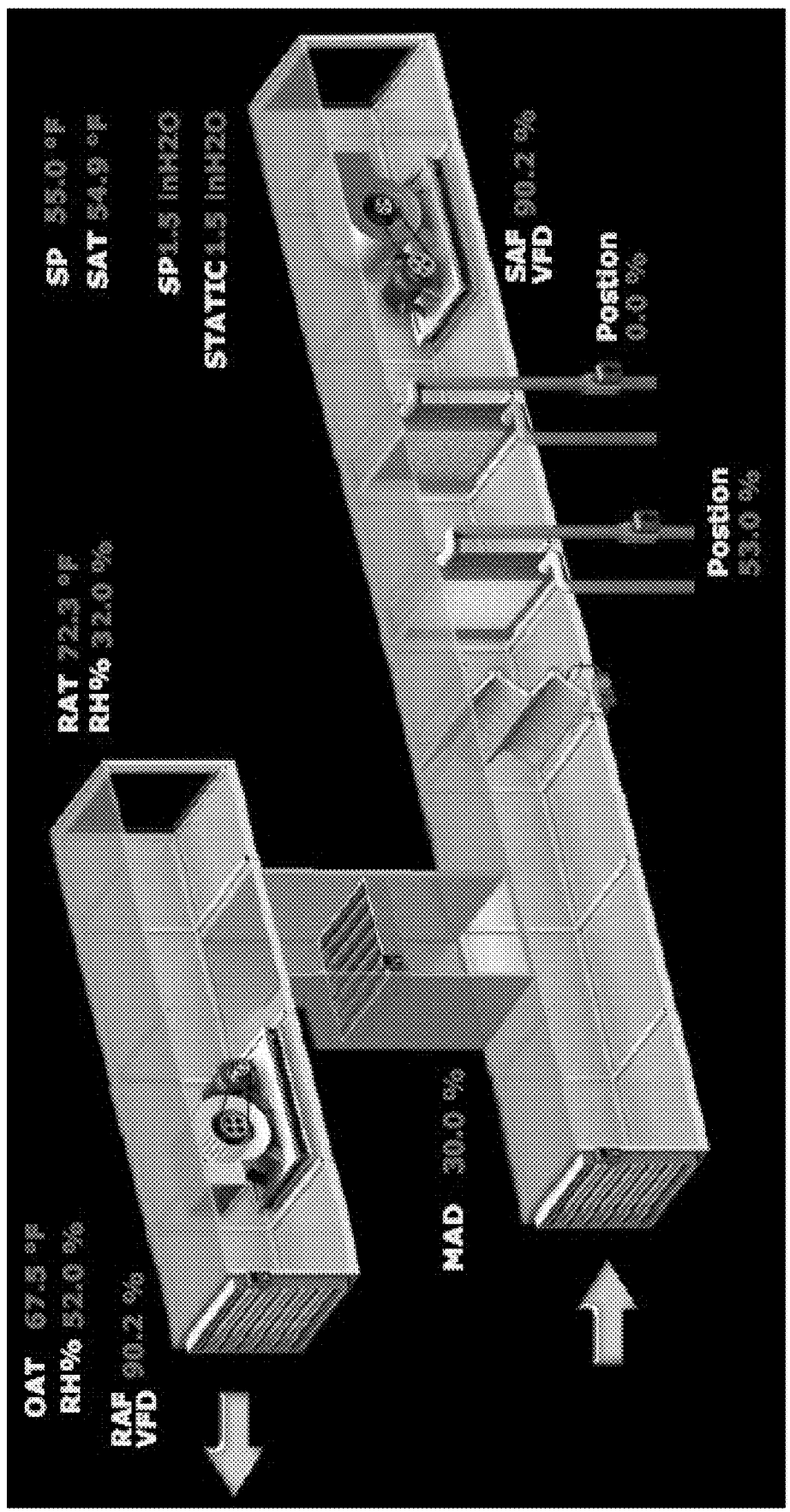
FIG. 7 shows internals of an example air handler that is heating air primarily used for cooling.

In this regard, FIG. 7 shows an example of an air handler unit. It shows an "OAT 67.5° F." indicating an outdoor air temperature of 67.5° F. and an "RH % 52.0%" indicating an outdoor air relative humidity of 52.0%. It shows a "RAF VFD 90.2%" indicating a return air fan variable frequency drive at a drive level of 90.2%, equivalent to a drive frequency of 54.12 Hz. It shows "RAT 72.3° F." indicating a return air temperature of 72.3° F. of the air returning from the served space, and an "RH % 32.0%" indicating a return air relative humidity of 32.0%. It shows a "MAD 30.0%" indicating that the mix air damper is set to a position corresponding to a mix of 30% fresh air and 70% stale air return. It shows a "Position 53.0%" indicating that the valve controlling the flow of chilled water to the cooling coil is 53.0% open. It shows a "Position 0.0%" indicating that the valve controlling the flow of hot water to the heating coil is 0.0% open. It shows a "SAF VFD 90.2%" indicating that the supply air fan variable frequency drive is at a drive level of 90.2%, corresponding to a drive frequency of 54.12 Hz. It shows a "SP 55.0° F." indicating that the target supply air temperature is 55.0° F. It shows a "SAT 54.9° F." indicating an actual current supply air temperature of 54.9° F. It shows a "SP 1.5 inH2O" indicating that the target static pressure setpoint for the supply duct is 1.5 in H2O. It shows a "STATIC 1.5 in H2O" indicating that the actual current static air pressure of the supply duct is 1.5 in H2O. Also shown are the return air fan, mix air dampers, supply air filter, cooling coil, heating coil, and supply air fan.

In one example, the air circulation method described above reduces the speed of the supply air fan, SAF. The method maintains the same total fresh air volume as before by compensating with the mixed air damper, MAD. In the example of FIG. 7, if the total air flow is 10,000 CFM, then there is 3,000 CFM of fresh air and 7,000 CFM of air being recirculated from the space, based on the position of the MAD. If all of the recirculation was eliminated, with 100% fresh air and no return air supplied to the fan, the new fan speed would be $$NewFanSpeed = \frac{3000}{10000} \times 90.2 = 27.1$$

If the initial fan power at 90.2% VFD is 40 HP, then the new fan power at 27.1% VFD is approximately 1.1 HP.

In some cases it is not possible to entirely eliminate the recirculation of the air. This would occur when the outside air temperature is below a certain temperature where there is a risk of freezing the ducting, for example. In such a case, some return air must be used to maintain the temperature of the mixed air at or above the freeze limit temperature.

When the SAF VFD is reduced, the RAF VFD must also be reduced to maintain the static pressure. If the RAF VFD must be zero to maintain the static pressure, then this imposes a lower limit on how much recirculation may be reduced.

As the recirculation is reduced, there may be additional heating or cooling needs for the mix that has been rebalanced towards fresh air. The method must calculate the cost of the new heating or cooling load and compare that to the cost saved in fan power. At a point where the extra costs and the saved costs match there is a lower limit on the reduction of recirculation.

In some examples, one of the plurality of energy optimization strategies is a method of controlling the heating and cooling of supply air in an air handler where heating is held off when the return air temperature is already higher than the supply, and cooling is held off when the return air is already cooler than the supply. This method checks whether the net effect of an air supply to a space is heating or cooling and reduces the opposite input in the air handler. As long as the minimum heat needed downstream is met, the air handler can hold off on heat input while the net effect of the unit is cooling, indicated when the return is warmer than the supply. Similarly, as long as the minimum cooling needed downstream is met, the air handler can hold off on cooling input while the net effect of the unit is heating, indicated when the return is cooler than the supply.

In this regard, referring again to FIG. 7, this diagram shows a supply air temperature, SAT, of 54.9° F. and a return air temperature, RAT, of 72.3° F. The temperature of the air stream has increased by 17.4° F. The net effect of this air stream on the spaces downstream is heating. This method therefore ensures that the heating valve does not open, adding more heat to the downstream spaces. It does this by the means available. For the example shown, the disclosed system may instruct the heating valve to remain closed (e.g., instruct the heating valve position to have a set point of zero), or the disclosed system may output a supply air set point such that the underlying control would not need to open the heating valve. This is limited by a lower allowed limit for the output air supply. This lower limit may be in the vicinity of 55° F. to maintain the air in the ducting at a temperature above the dew point of the air in the plenum, lest the ducting condense water in the plenum air and the water run down into the space. Where provided, sensors on the return air humidity and temperature can be used to ascertain the dew point of the air in the plenum.

In some examples, one of the plurality of energy optimization strategies is a method where unnecessary water circulation is reduced in water loops by turning down pump speed, as determined by examination of supply and return temperatures, and the position of valves in the loop that control the release of energy from the loop to other systems. In such a system, the supply and return temperatures of a water loop and the downstream releases of energy from the loop to other systems are examined to determine if there is circulation of the water in the loop in excess of what is needed to satisfy the operating limits and requirements of the loop and downstream loads.

For example, when the supply temperature of a loop is 48° F. and the return temperature is also 48° F., the loop is providing neither net heating nor cooling to the building, and so may reduce the volume of water circulated. The method examines the release of energy from the loop downstream. For example, the energy from the loop may be released by cooling values at air handlers, which allow some portion of the circulating water to pass through the air handler, releasing the energy from the water loop to the air stream. When all of these valves are closed, then there is no requirement for cooling on the loop and the method may reduce the circulation until there is a need. Upon detection of a valve opening up to release energy from the loop, the circulation may be increased again to circulate the energy from the head to the loop and its downstream need.

Figure 6:
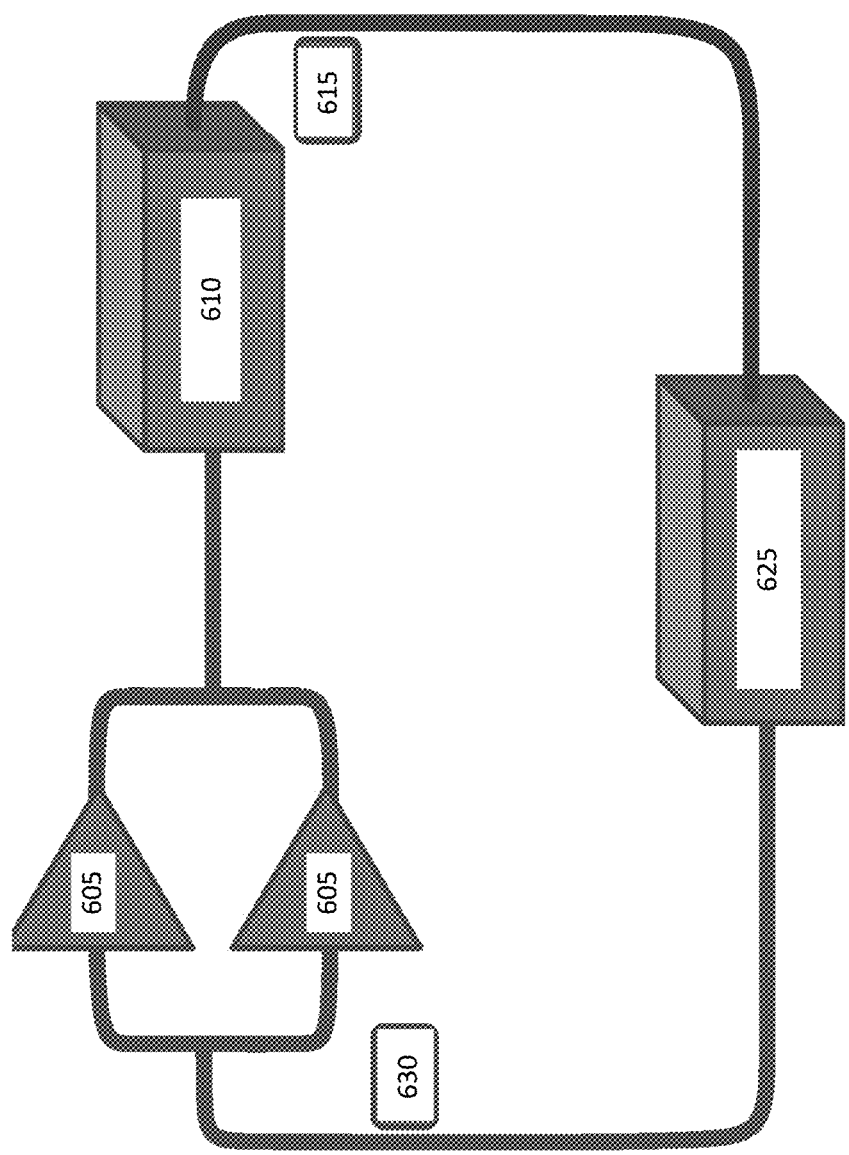
FIG. 6 illustrates an example hot water loop.

FIG. 6 shows a loop where the example method of controlling pump speed is applied.

FIG. 6 shows an example of a water loop in a building. It shows two pump 605 units pumping water around the loop. It shows a heating unit 610 that adds heat to the water passing through it. This may commonly be a boiler, hot water heater, or heat exchanger with a hotter source of heat. Emitting from the heating unit 610 is the HWS 615, hot water supply. The heat loads in building 625 represent the aggregate of all the heat loads in the building to which the heat from the HWS 615 is lost. The HWR 630, hot water return, is passed back to the pumps to repeat the circuit.

In this example method, when the temperatures of the HWS 615 and the HWR 630 are close, the circulation of the loop may be reduced. In this example, this would be accomplished by turning off one of the two pumps 605. During this circulation, some of the heat in the loop is lost from plumbing and piping, potentially leaking the heat into places where heat is not required or desired. For example, it could leak heat into a space that is primarily in cooling mode, such as a core zone. Reducing the circulation also reduces the pressure in the loop, extending the life of plumbing and valves.

In some examples, one of the plurality of energy optimization strategies is a method of controlling the heating and cooling of water loops where heating is held off when the return water temperature is already higher than the supply, and cooling is held off when the return water is already cooler than the supply. This method checks whether the net effect of a water loop in the building is heating or cooling and reduces the opposite input to the loop. As long as the minimum allowed loop temperature is met, the heat input to the loop can be held off when the net effect of the loop is cooling, indicated by a return temperature warmer that the supply. As long as the limits of allowed loop temperature are met, the cooling input to the loop can be held off when the net effect of the loop is heating, indicated by a return temperature cooler that the supply.

Referring again to FIG. 6, the method of controlling heating and cooling of water loops ensures that the heating unit does not apply more heat to the loop until the HWR temperature is less than the HWS temperature. This same method would apply for a glycol loop, a heat pump water loop, or a chilled water loop, among others, considering heating or cooling or both of a given loop type.

In some examples, one of the plurality of energy optimization strategies is a method of balancing the mix of fresh air intake and return air where dry bulb, wet bulb, and dew point temperatures of fresh air, return air, and desired supply air are considered and the mixture is used that requires the least amount of energy to produce the desired supply air. In such a method, a mix of fresh and return air is selected in air handlers that require the least energy to meet the target supply requirements. In this method, inputs include dry bulb temperatures (e.g., three dry bulb temperatures), wet bulb temperatures (e.g., three wet bulb temperatures), and dew point temperatures (e.g., three dew point temperatures) from the building. In fact, some of the wet bulb and dew point temperatures may be derived in the data centre from dry bulb readings and relative humidity readings. The outdoor air temperature, dry bulb, wet bulb, and dew point, may also be retrieved from or derived from a public weather station instead of from the building itself. In any case, the method examines the relative values of the dry bulb, wet bulb, and dew point temperatures. Depending on the relative values, the method resolves the situation into one of several predefined possible cases. In the example discussed here, there may be three such possible cases.

Each of the possible cases has a set of rules describing how to calculate the best mix of fresh and stale air for the air handler. The evaluation of the rules outputs a new value that is the optimum mix ratio of the air supply.

The cases are analyzed by testing the values of air mix ratio between the minimum air ration allowed and the maximum possible air mix ration. The values of the mixed air's dry bulb, wet bulb, and dew point temperatures are determined from the outside air and return air dry bulb, wet bulb, and dew point temperatures and the air mix ratio. These values of mixed air dry bulb, wet bulb, and dew point temperatures result in a number of cases on how to proceed with the mixed air. In one case, the mixed air is dry enough to satisfy conditions but needs to be heated. In another case, the mixed air is dry enough and needs to be cooled. In another case, the mixed air is not dry enough and needs to be cooled to eliminate water vapour and then heated back up again, where such drying capabilities exist and are required. A determination of the input heating and cooling power required to reach the final supply air conditions is made. Then the heating and cooling powers are weighted by their relative costs to determine the total cost function of the given air mix ratio. The air mix ratio producing the lowest cost is then selected as the correct mix ration.

In some examples, one of the plurality of energy optimization strategies is a method of controlling the heating and cooling of supply air in an air handler where heating is held off unless there is a need for heating downstream and cooling is held off unless there is a need for cooling downstream. In this method, the system computes a function using the downstream temperatures and their allowed limits. In one example, the system tests whether or not all downstream units are within their limits. If they are within their limits, then the system computes a function of these temperatures and adjusts the air supply to bring the output of this function to zero as far as possible while holding the total cost of power into the air handler at a minimum. This function may be a weighted average value of the temperature differences from the mean of their limits. If, however, some of the downstream units are outside of their temperature limits, the system will adjust the air supply to bring them all inside their limits. If the units cannot all be brought inside of their limits, then the system will adjust the air supply according to some function. In one example, the system will compute the maximum temperature error over the upper limit and the maximum temperature error under the lower limit and adjust the air supply to equalize these two errors, thereby reducing or minimizing the worst case errors.

Figure 9:
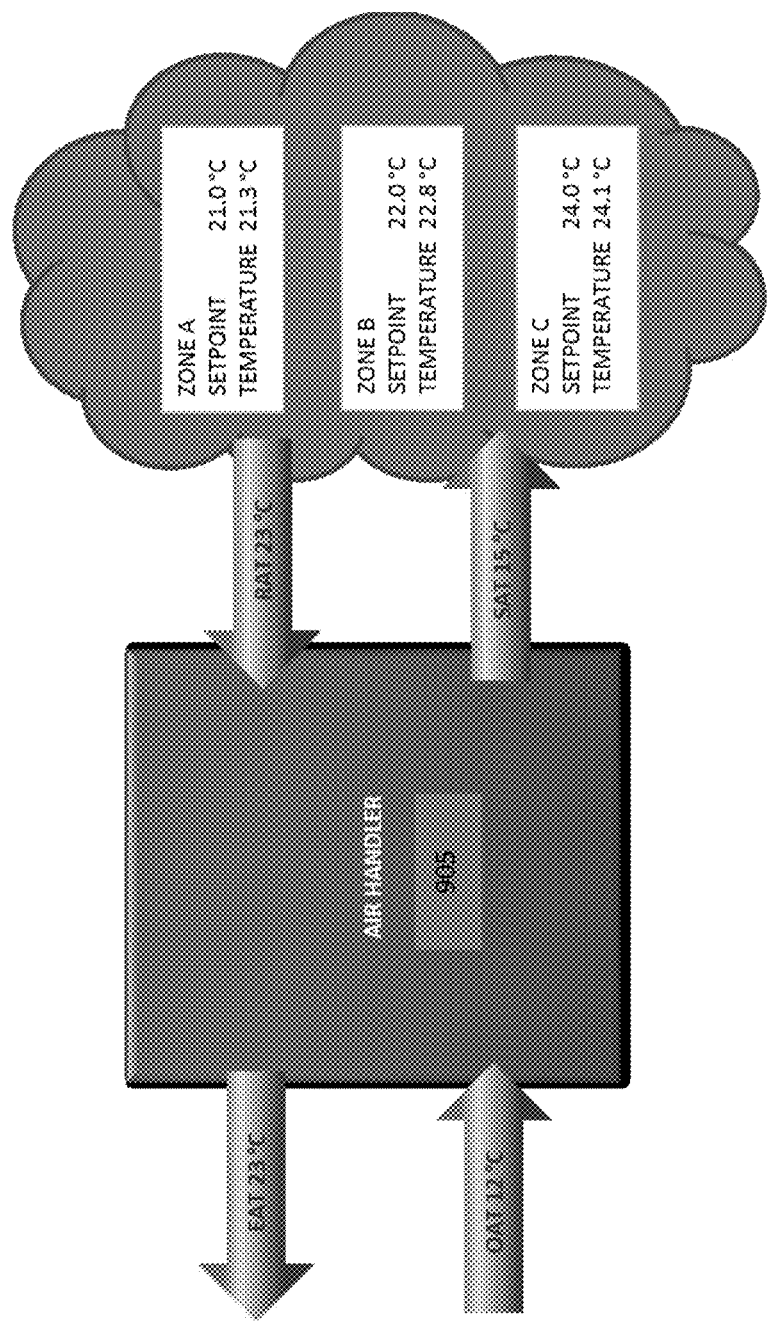
FIG. 9 illustrates an example system with an imbalance between an upstream unit and its downstream loads.

Such a method can correct an imbalance between a unit and the units downstream, as shown in FIG. 9. Imbalance may be corrected by controlling the heating and cooling of supply air in an air handler where heating is held off unless there is a call for heating in a downstream unit and cooling is held off unless there is a call for cooling downstream. The air handler 905 is a building HVAC air handler unit. It blows supply air into the zones, shown as "SAT 15° C.", at a current temperature of 15° C. It accepts air back from the zones, shown as "RAT 23° C.", at a current temperature of 23° C. It exhausts some stale air to the outdoors, shown as "EAT 23° C.", at a current temperature of 23° C. It draws some fresh air from outdoors, shown as "OAT 12° C.", at a current temperature of 12° C. Inside the unit it mixes some stale return air with the fresh air and feeds the mixed air to a supply fan, via a cooling coil and a heating coil. The diagram shows the supply air is warmer than the fresh air coming in. This may indicate that the supply air stream is heated by mixing with some return air, or heating by the heating coil. The supply air is blown into a group of 3 zones, A, B, and C. This air is normally ducted to each of the zones. The current setpoint temperature of each zone is shown as 21.0° C., 22.0° C., and 24.0° C., respectively. The current actual temperatures in the zones are 21.3° C., 22.8° C., and 24.1° C., respectively. All three actual zone temperatures are higher than their set point temperatures. The air supply temperature can be lowered since the spaces are above their required temperatures.

In the example shown, all of the units downstream, Zones A, B, and C, are above their temperature setpoint. They already have an excess of heat beyond what is needed to meet their set point. Yet the air handler is adding heat to the supply air stream either by mixing with return air or by heating the air supply with a heating coil. This would be typical with a conventional fixed supply air temperature. In contrast, the example disclosed method considers the requirements downstream and reduces the supply heating when it is not called for. It also reduces the cooling when similarly not called for.

In some examples, one of the plurality of energy optimization strategies is a method of controlling the heating and cooling of water loops where heating of the loop is held off unless there is a need for heating in a downstream unit and cooling of the loop is held off unless there is a need for cooling downstream. Such a method checks whether the net effect of a water loop is heating or cooling and reduces the same when the devices downstream are meeting their requirements, as long as minimum and maximum allowed loop temperatures are met. For example, if a hot water loop is only connected to the hot water coils of 10 air handlers and all 10 valves are closed, then the heat input to the loop can be held off as long as minimum allowed loop temperatures are met.

In some examples, one of the plurality of energy optimization strategies is a method of coordinating the static pressure of all the zones in a building so that the pressures may be reduced without adversely affecting the relative pressures of the zones. The static pressures are intended to ensure a proper direction of airflow at system boundaries of rooms, groups of rooms, zones, groups of zones, or the whole building. Where turning one static pressure up or down may adversely affect the airflow at the associated system boundary, coordinating all of the static pressures up or down together will maintain the correct direction of air movement. This method further considers the other forces affecting static pressure and airflow, such as wind speed and direction, and outdoor temperature's stack effect, and makes adjustments that will still meet requirements as these factors change. As these static pressures are reduced, the associated fan speeds in the building will be reduced also, easing the electric power need into the building. This reduces pressures in the ducting, pressure drops, air leakage from the ducts, and strain on duct sealing.

In some examples, one of the plurality of energy optimization strategies is a method of reducing the degree of services provided to spaces in a building so that they match the planned or actual use of the spaces, by reducing the lighting, heating, cooling, fresh air, or water pressure in each space to match the needs. Such a method makes use of a schedule or plan for the use of the spaces in the building, or from a history of occupancy cues from the spaces, where occupancy cues may come from many sources, such as occupancy sensors, light switches, cameras, security systems, elevators, or any other source that indicates or implies occupancy in a given area. The planned use of the spaces can come from direct user input of planned space uses and/or from information from the buildings sensors and systems.

A set of predefined information (e.g., in the form of a matrix) contains the minimum service requirements for each space in the building giving the minimum service requirements for each of the modes for which the space may be used. This information is used to translate the planned use of the spaces into a planned minimum service requirements levels for all the spaces. Another set of predefined information (e.g., in the form of another matrix) contains the limits of the rates at which the equipment serving the spaces is able to transition the service levels in the spaces using controlling the requirements to be applied to a space whereby there are no instantaneous increases in the required services to such a space, but instead requirements are ramped smoothly from one service level to another. This other set of information is used to correct the planned minimum services levels to ramp from one set of requirements to another, so that the equipment will never have to change the service levels in a space instantaneously, or at a rate that the equipment cannot satisfy, or any unknown rate. This ensures that service levels are met on schedule with a defined power limit. It also corrects service levels in spaces that do not match the service levels being provided by other equipment for the same space as determined, for example by reducing services in each space in a building by comparing the degree of each service in any given space and when any one service is off or reduced then reducing the other services based on a resolution plan.

For example, in a conference room, if the lights are turned out, then the indication is that the space is unoccupied and ventilation, cooling, heating, and water pressure may be relaxed. The method also considers the connections between the use of one space and the use of others. For example, when a certain area of the building is intended to be used, it may also be necessary to provide lighting in corridors leading to that area of the building, lighting in the associated washrooms, and exhaust ventilation in the associated washrooms.

In one example, the method of reducing services in each space in a building by comparing the degree of each service in any given space and when any one service is off or reduced then reducing the other services based on a resolution plan is implemented by checking the service levels of the various services provided to a space and identifying service level combinations that do not match known operating modes of the space. This information can be used to adjust the planned use of the spaces. This information can be gathered from some sensors and systems directly. Some of the information may be acquired by analytic processing of the direct information. For example, rising $CO_2$ levels would indicate a space that is being used.

As noted above, the system may implement a method of controlling the requirements to be applied to a space whereby there are no instantaneous increases in the required services to such a space, but instead requirements are ramped smoothly from one service level to another. Such a method corrects the requirements for services levels in the building so that they do not change instantaneously, but ramp smoothly from one service level to the next. This method uses information on the limits of the rates at which the equipment in the building can ramp each service in each space from one level to another. This information can be acquired through manual experiments and provided as information for the method to use. This information can also be acquired by analysis of equipment performance as they are running in actual use, determining the capabilities of the equipment from the data collected. In fact, the method may evaluate the system capabilities on an ongoing basis as they may change over time and varying operating conditions.

In this regard FIG. 8 illustrates an example of a space service level determination system and how such a system generates a service plan for all spaces. As shown, there may be a number of users 805, 810 accessing the system via, for example, laptops or computers. The users 805, 810 have different levels of access that grant them access to certain parts of the system—depending on the permissions attached to their access credentials. What is shown in the diagram are some users that can only access the Planned Use of the Spaces matrix 815, namely the general users 805; and a user that can access Planned Use of the Spaces 815 and the Ramp Limits information 820, namely the technical user 810. The diagram shows data from sensors, switches, etc. 825, in the building that feed into an Analytics Engine 830, which may be a software module implemented by a processor of the disclosed system. This Analytics Engine 830 then has access to the Planned Use of the Spaces information 815 and the Ramp Limits information 820. The system can update these based on information from the building. The centre column shows a number of components. The top component is the Planned Use of the Spaces matrix 815. It represents all of the planned use of all the spaces in the building, indicating what mode each space is to be in at any given time. Each space has its own unique modes of operation. This Planned Use of the Spaces information 815 is combined with information about the service requirements of each mode of use of each space in the building, stored as a Service Requirements matrix 835. When the Planned Use of Spaces information 815 is combined with the Service Requirements information 835, a complete set of service requirements in any given space at any given time is produced. This result is further combined with the Ramp Limits information 820 information about each of the equipments in the building, so that the requirements are ramped smoothly from one service level to another. This produces the Service Plan 840, which plans service for all spaces at all times. This Service Plan information 840 (which may be in the form of a matrix) can then be used for control of the building.

Information about the planned use of the spaces in the building is collected from users directly and/or from examination of the data from the sensors, switches, etc., in the building. This information is used (e.g., by an analytics engine implemented by a processor of the system) to generate a plan of what is planned for every space at every time in the building. In this plan there are multiple modes that may be planned for each space—for example, reducing the degree of services provided to spaces in a building so that they match the planned or actual use of the spaces utilizes a table of the required services for each spaces' modes to translate the plan of use of spaces into the required service levels to meet the needs of the planned uses. Reducing services in each space in a building by comparing the degree of each service in any given space and when any one service is off or reduced involves comparing the services actually present in spaces to detect when services are being provided that are not needed or used. These provide further updates to the use plan. By controlling the requirements to be applied to a space whereby there are no instantaneous increases in the required services to such a space, the services plan is corrected to remove any sudden changes in service levels by making smooth ramps from one service level to the next. The result is a complete plan for the required service levels in all spaces at all times.

In some examples, one of the plurality of energy optimization strategies is a method of selecting the most efficient energy source to supply the required service levels in a space and maximizing the most efficient sources before adding less efficient sources. Such a method adjusts the various sources that can be used to meet a service need so that most of the energy comes from the most efficient source. For example, if a room can be heated by a heat pump, a gas burner, and an electric resistance coil, the method uses the most efficient source first, which may be the heat pump, before using the gas burner or the electric heat. If this is not sufficient heat to meet the service need, then the second most efficient source would be added, which may be the gas burner. The least efficient source is only employed once all more efficient sources have been maximized. As to which source is more efficient, the method uses information about the effectiveness of each source under its various operating conditions to determine how effective it will be in a given situation. In this example, the heat pump may be able to provide heat at a cost of \$0.013/kWh of heat, the gas burner at a cost of \$0.045/kWh of heat, and the electric heat at a cost of \$0.08/kWh of heat.

In some examples, one of the plurality of energy optimization strategies is a method of producing output in the most efficient manner possible from machines by measuring the output power of the complete system relative to the input power of the complete system over the range of operating conditions, determining the conditions that produce the output power for the least amount of input power, and manipulating the operating conditions of the machine to produce most of the output under conditions where it is most effective. Such a method adjusts operating conditions of a machine to produce its output under the conditions where it is most effective. The method uses data collected about the input power, output power, and operating conditions to learn the operating conditions where an output is produced for the least amount of input. This may not be the conditions of the maximum output. If so, the method may shift some of the load away from the time of the peak load and so run the machine longer at its more efficient operating condition to produce adequate output. The method will continue to observe the performance of the machine as its performance changes with wear, maintenance, and operating conditions. In the case where the machine is a chiller unit or chiller plant, data can be used from the rest of the building to understand the total net cooling need for the building to keep the chillers' operating conditions as close to the optimal point as possible. Similarly, where the machine is a boiler unit or boiler plant, total heating need can be taken into account.

Figure 3:
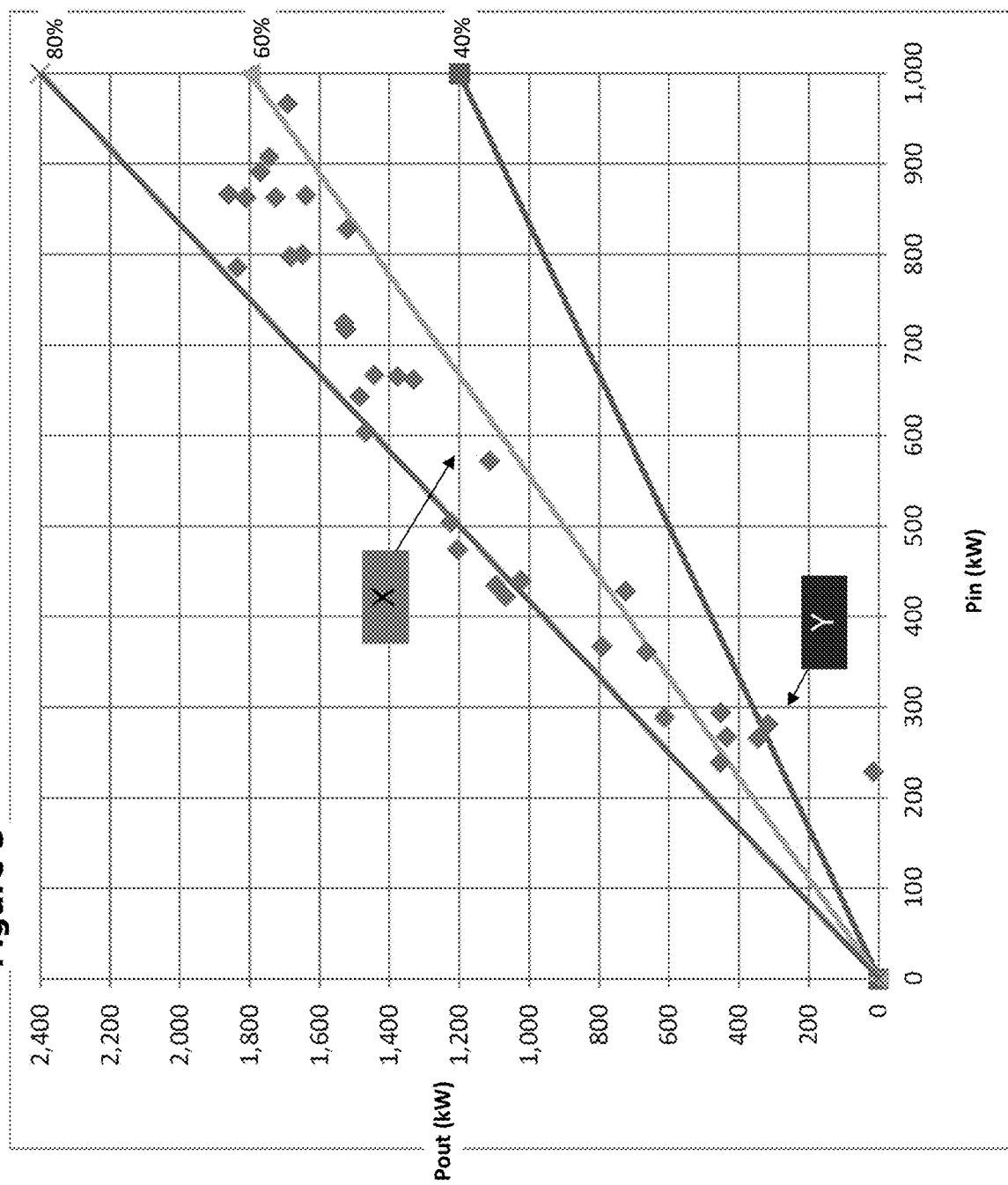
FIG. 3 shows a plot of example performance data from a chiller, illustrating an example of identifying a preferred region of operation of a machine.

FIG. 3 is used to illustrate an example of how to determine the most optimum operating conditions of a machine in a simplified case. FIG. 3 shows a plot of the output power versus input power for a chiller. It plots a number of points with diamonds, showing the measurement of output power, "Pout (kW)", in kW for a corresponding input power, "Pin (kW)", in kW measured at an unspecified time. It shows the output power on the vertical axis in kW and the input power on the horizontal axis in kW. It also shows three lines marked "40%", "60%", and "80%". Any point above one of these lines exceeds the given percentage in efficiency. For example, the points above the "80%" line have better than 80% efficiency at producing the output from the corresponding input. There is a section in the middle, indicated by Arrow X, which represents the area where the performance of the machine is most likely to produce the most efficient results. Points in this range are more often in the area of 80% efficiency. It is desirable to produce the output in this area as much as possible. In the above graph, this occurs at input powers between 400 and 650 kW, or outputs between 900 and 1500 kW. Above 1500 kW of output, the efficiency begins to reduce. The points in the range indicated by Arrow Y are those that can be as low as 40% efficient. It is desirable to avoid producing the output in this area. This plot illustrates how measuring the machine's performance and optimizing setpoints to operate the machine in the optimal area has a large impact on unit performance. In more complex examples, there may be more inputs to the efficiency function than the single input load, as shown in this example.

At the high end of the output, the efficiency drops off towards 60%. At the low end the efficiency drops to nil as a certain amount of energy is always used when the machine is spinning. In the middle, however, the efficiency is usually towards 80%. This method manipulates the load on the machine so that it is most often in the mid-range where the kWh of output is produced with the least amount of power input. In the case of a chiller, this may be accomplished in some cases by coordinating the chilled water loads downstream. In many cases, multiple input factors affect the efficiency of the machine, such as load, loop flow, loop temperature, evaporator temperature, and condenser temperature. The system makes the necessary adjustments to some or all of these parameters, within their allowed limits, to produce the maximum amount of output energy in the most efficient range of the machine. It may also be adjusted by controlling the flow in the chilled water loop. This may be accomplished in some buildings by shutting down one of two pumps, or throttling a VFD in another. While a simple two-dimensional graph is shown in FIG. 3, in practice the number of inputs may be many more than one, leading to complex multi-dimensional spaces for characterizing the performance of the machine of interest.

In some examples, one of the plurality of energy optimization strategies is a method of blending the energy in adjacent spaces where one is too warm and the other too cool, by adjusting their respective supply and return fans to cause circulation between the spaces to balance the energies between them and only adding enough additional energy to make up the deficiency of the net energy of the two. This method considers the average energy in air spaces that are adjacent or sufficiently open to each other to affect an air flow between them. Air transfer between them is used to balance out the high and low temperature spots closer to the average. The air handlers in each space are adjusted to move the air. For example, when there are two spaces, the supply fan in one is reduced while the return fan in the other is reduced. The static pressure imbalance forces the air to move from one space to the other. Once the temperatures have been advantageously balanced, the air handlers can be returned to prior operation.

In some examples, one of the plurality of energy optimization strategies is a method of reducing the energy flow across system boundaries by allowing temperatures inside the boundary to be at temperatures closest to the temperatures at which the net heat inside the boundary balances with the net heat across the boundary while remaining within their allowed operating range. The closer the temperatures inside the boundary can be kept to the temperature at which the net heat flows in balance, then the less additional energy is required to fulfill the balance. Such a method manipulates the temperatures in spaces to get the most effective net energy flows across a system boundary in regards to the total energy of the building. For example, when a building is in cooling mode, it may be advantageous to allow the temperatures in the perimeter spaces to rise towards but not exceed the balance temperature. With higher perimeter temperatures, the heat gain through the building shell may be reduced, and as a result, the cooling load of the building as well.

In some examples, one of the plurality of energy optimization strategies is a method of exciting building inputs to produce responses that can be measured and used to determine behaviour and relationships in factors in the building. The excitation is a small signal added to a regular input. Corresponding variations in other measurements in the building are found by correlation. The magnitude of the correlations and the significance of the t-score and other statistical factors all indicate information about the relationship between the input that was excited and the factor that has been measured. Such a method uses the inputs being provided to the building, such as a temperature set point, or a start time for a lighting schedule. It is often possible to add a small perturbation to the value that would normally be inputted. For example, if the temperature set point being inputted would normally be 15.5° C., it may be possible to alternate between 15.2° C. and 15.8° C. without significant negative impact on the performance of the building. By alternating between these values using a pseudo-random binary sequence, an effect called coding gain, makes the impact of the small variations more significant than other factors or noise in a correlation calculation between the input and the output, when applied over a sufficient period of time.

When the excitation is a binary high-low variation, the correlation gives a gain, representing how much the dependent value changes for a given change in the input, and the polarity of the change. For example, if the independent input is a fan speed and the dependent variable is the total electrical consumption of electricity measured at the utility meter, a gain of $1\times10^{-4}$ might indicate that the total electrical consumption increases by $1\times10^{-4}$ kWh for every 1% increase in fan speed. A gain of $-1\times10^{-4}$ might indicate that the total electrical consumption decreases by $1\times10^{-4}$ kWh for every 1% increase in fan speed.

Variations using sinusoidal inputs help define independent-dependent variable relationships as related to their frequency response.

In some examples, one of the plurality of energy optimization strategies is a method of automated self-repair upon detection of equipment degradation or failure by the system. The system performs some common troubleshooting practices and uses the building controls system to repair faults, just as a building technician would. For example, when a stuck valve is detected, a technician may conventionally use the building controls to stroke the valve full open and full close several times to try to unstick the valve. The present method can detect the stuck valve, log it, stroke the valve open and closed a number of times as a technician would have, log the result, and notify the technician if the usual practice has been unsuccessful. Energy is saved by returning the system to normal operation as quickly as possible, and identifying failing equipment before it becomes incurable.

Figure 11:
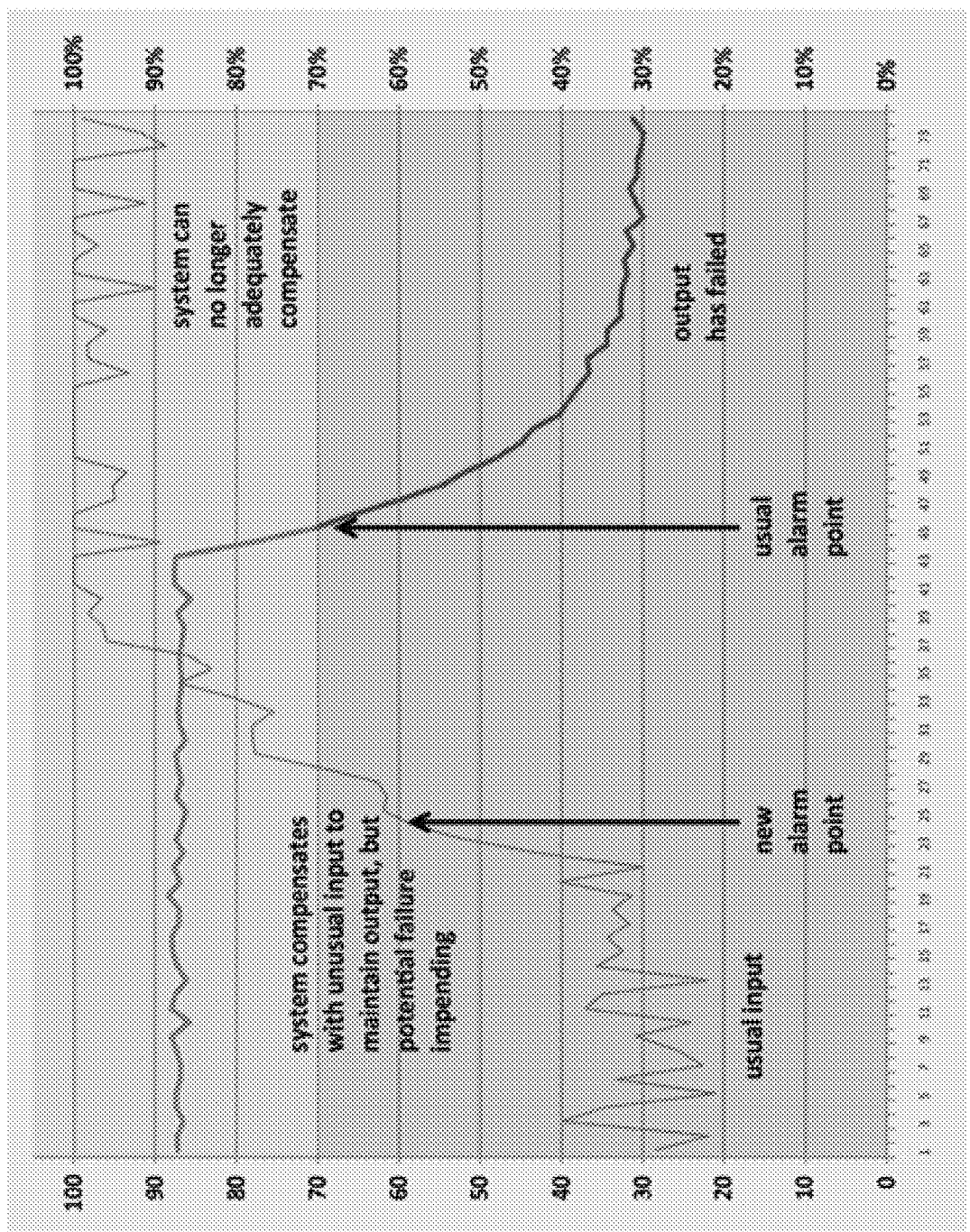
FIG. 11 is a graph that shows live detection and diagnostics according to an example embodiment.

In some examples, one of the plurality of energy optimization strategies is a method of detecting and diagnosing potential equipment failure by monitoring the performance of hundreds of processes in the building and detecting any abnormalities based on current behaviour, performance history, and operating requirements. Such a method signals an alarm when it detects that an abnormal situation has arisen. This strategy may use not only the process outputs, but the inputs and process history as well. This may be different from traditional diagnostics methods, which detect equipment malfunctions based on outputs alone. This method may have the advantage of being able to detect problems at an earlier stage, before the required service levels are no longer met and before the associated machine fails catastrophically. For example, if a certain loop normally has a loop flow of 1 L/s per 1% of pump speed setting on the pump's VFD, then if the flow is 50 L/s at 80% speed this is identified as a fault, even though the loop is able to maintain its usual 50 L/s flow. Since it is using a higher speed input to maintain the flow, it is recognizable as a defect. FIG. 11 shows an example where the machine input and output have been plotted over time. The input starts around 30% and ends at 100%. The output starts at 87° C. and ends at 30° C. At the point that the input has increased beyond the normal range, indicated by the arrow marked "new alarm point", it is possible to identify an abnormal machine behavior, even though the usual output of 87° C. is being maintained through an increase in the input. This precipitates a response to the abnormal machine behavior much sooner than would be detected using traditional methods, indicated by the arrow marked "usual alarm point", which only occurs once the input has fully saturated at 100% for some time and the output has fallen below some limit.

FIG. 1 illustrates an example of a method for calculating ramped envelopes for service level changes, for example to be used in controlling the requirements to be applied to a space whereby there are no instantaneous increases in the required services to such a space, but instead requirements are ramped smoothly from one service level to another. FIG. 1 is a plot of temperature vs. time, showing the required temperatures for space comfort over time in solid lines. At a time associated with points D, E, K, and J, the service level requirements become more restrictive. The allowable range of temperatures between line EF and line KL is much smaller than between lines AD and GJ. Line AD is the initial upper limit of temperature in the space. Line GJ is the initial lower limit of temperature in the space. These changes to EF and KL, respectively, at a given time are shown. There is typically a limit to how fast the equipment for this space can cool or heat it. Line BE shows the limit of how fast the space can be cooled. Line HK shows the limit of how fast it can be heated. These ramp rates are not necessarily the same. The ramp limit BE intersects the upper limit AD at point C. Therefore, the ramped corrected upper limit will be the new limit ACEF. Similarly, the new lower limit will be GIKL.

Figure 2:
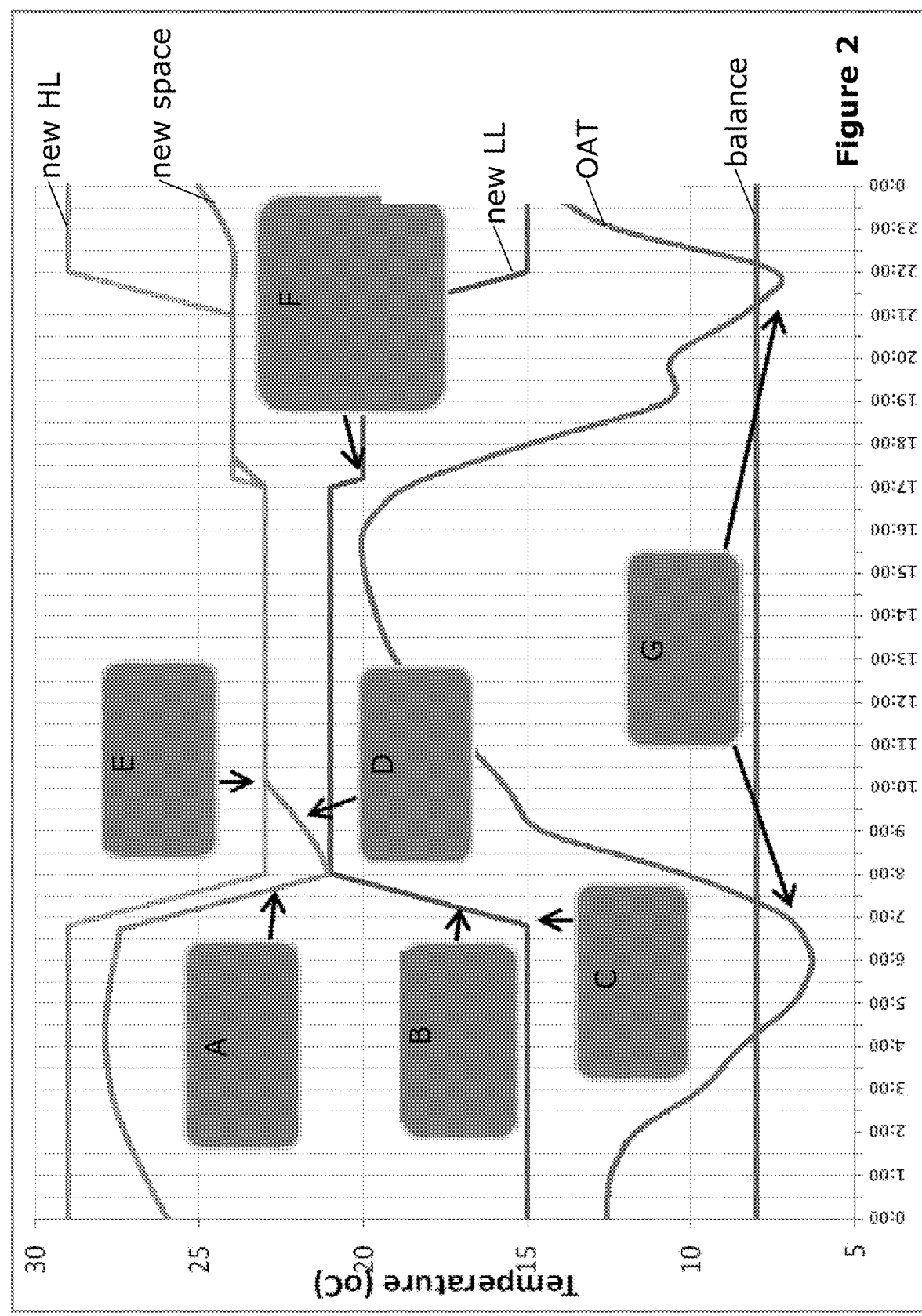
FIG. 2 is a temperature/time plot illustrating operation of an example embodiment.

FIG. 2 is a temperature vs. time plot illustrating temperature in a typical space as operated using example methods of this disclosure. It plots a number of temperatures associated with a space over a 24 hour period. "new HL" is the high limit of the allowed operating temperature envelope for the space. "new LL" is the low limit of the allowed operating temperature envelope for the space. "new space" indicates the actual temperature of the space. "OAT" is the outside air temperature. "balance" is the outside temperature at which the space requires neither heating nor cooling because its heat loss to the outside environment is matched by heat load in the space, mostly from electrical sources.

Considering FIG. 2 in the context of using outdoor air to cool the space inside a closed system boundary below the needs of the space in advance of a cooling need in the closed system boundary so that the coolness may be buffered and stored in the space ahead of the need, forestalling mechanical cooling, this action is shown lowering the temperature of the space, "new space", to the lower limit, "new LL" at 8 AM. Based on prior operational data and the weather forecast, the system has predicted that the space will primarily need cooling on this day. Therefore, it has lowered the space temperature as much as possible using as little energy as possible from utility sources. This coolness is buffered as much as possible in the space by 8 AM.

Specifically, as shown in FIG. 2, in this example, arrow A indicates that the outside air is used to purge the warm air in the spaces at startup (based on the forecasted outside air temperature (OAT)), which uses less energy than running the chiller. Arrow B indicates that the calculated new lower limit has a smooth startup ramp, which results in no power spike and controlled delay. Arrow C indicates where the equipment has started, which is later than was necessary with a typical system, due to a controlled ramping used in this invention. Arrow D indicates that even as the temperature in the space rises, the cool air buffer from the outside air can be used while still meeting temperature targets and without activating the chiller. Arrow E indicates that the start of the chiller is delayed later than it would be by conventional methods. Arrow F indicates that the space was allowed to ramp to a light occupancy mode. The use of more modes than the usual "occupied" or "unoccupied" means that energy can be saved when the requirements are reduced to match actual needs of a given time period and the equipment is adjusted for the new requirements. Arrow G indicates that the space is net losing heat via the building shell when outside air temperature (OAT) is below the balance temperature. During these periods the average building temperature will drop. When the outside air temperature is above this balance temperature the average building temperature will rise. Using this balance temperature and the weather forecast, the system is able to predict future heating and cooling needs.

Figure 4:
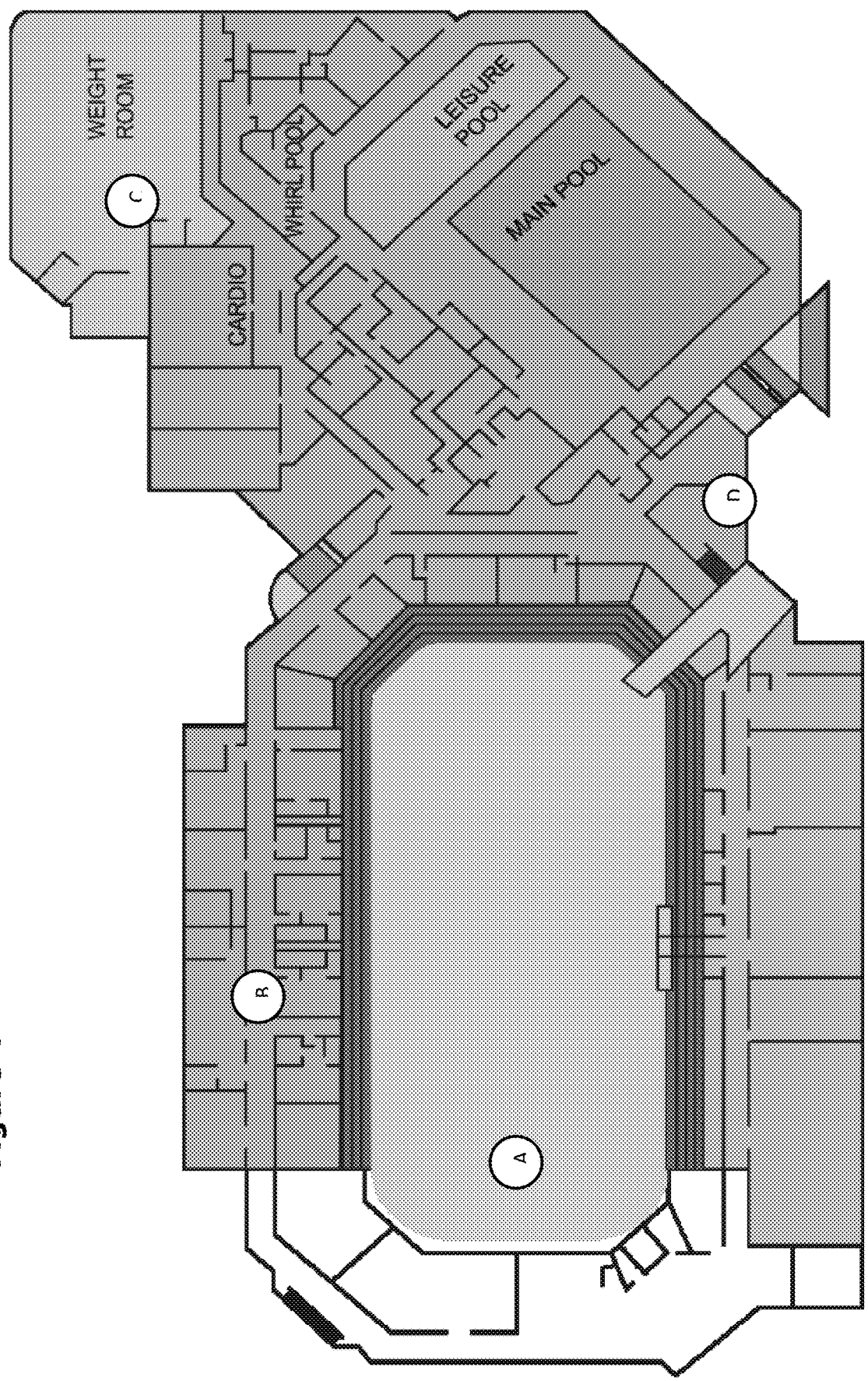
FIG. 4 shows an example of a space use plan.

FIG. 4 shows a breakdown of the spaces in a complex, such as might be used in the space requirement prediction methods described above. There is a single large space on the left amid a number of smaller rooms, and a number of other rooms labeled "CARDIO", "WEIGHT ROOM", "WHIRL POOL", "LEISURE POOL", and "MAIN POOL". Each of the smaller unidentified rooms would in practice have some designation, such as "RM102", but such is not shown in this diagram for clarity. The identification of the individual spaces is used to plan the requirements of each space separately and to identify patterns of behavior and usage that are particular to each space. For example in some spaces, such as a server room, it may be normal for lights to be out but cooling on to maintain the temperature in the room. On the other hand, the cardio room may not normally have the HVAC on and the lights off, and with this understanding the system can identify the opportunity to turn down or off the HVAC in the room when the lights are turned off. In the example of FIG. 4, space A currently has the HVAC on but the lights off. Since space A is not expected to operate with the lights off, the system can identify the opportunity to turn down or off the HVAC in this space. Space B currently has the lights on but the HVAC off. Since space B is not expected to operate with the HVAC off, the system can identify the opportunity to turn off the lights in this space. Space D currently has the HVAC on and lights off. Since space D is expected to operated with the HVAC on and lights off (e.g., space D is a server room), no changes will be made by the system. Space C may have different use plans, for example "unoccupied" (in which both the HVAC and the lights may be turned off by the system), "occupied" (in which both the HVAC and the lights may be turned on), and "light use" (in which the lights are on but HVAC may be turned down).

Figure 10:
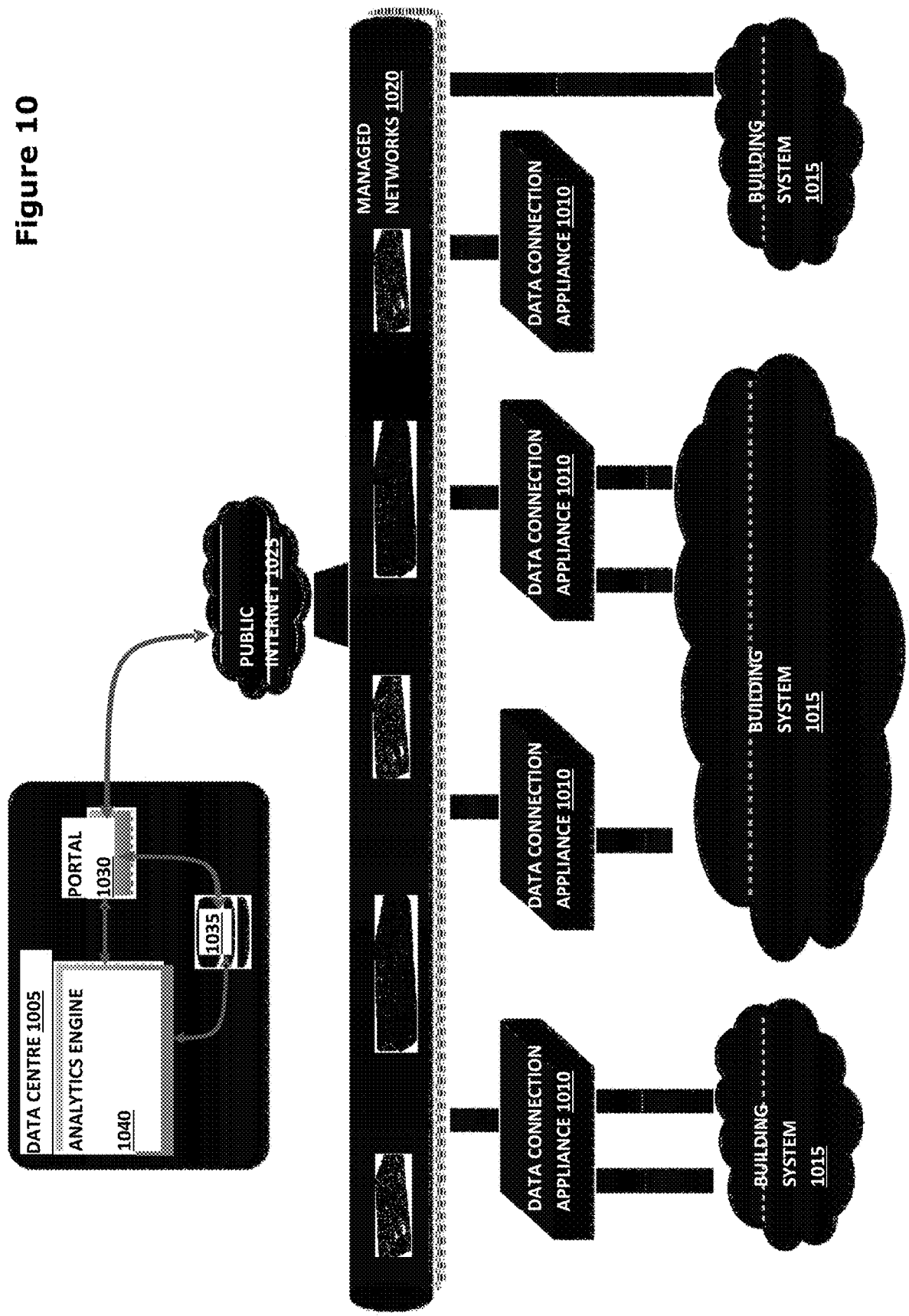
FIG. 10 illustrates an example system for reducing energy use in buildings according to an example embodiment.

FIG. 10 shows an example embodiment of a system for implementing and resolving conflicts among a plurality of energy optimization strategies (e.g., two or more of the strategies described above). At the base of the diagram are a number of unconnected building systems 1015. These building systems 1015, the data connection appliances 1010, and the managed network 1020 are all within a building, or campus of buildings. The data centre 1005 is remotely located, and may be accessible via wired or wireless communications (e.g., via the public internet, private intranet, etc.). The building systems connect via appropriate manners of communications (e.g., direct wired communications or wireless communications) with data collections appliances. Some of the data connection appliances 1010 are connected between the building systems 1015 and the managed networks 1020. The data connection appliances 1010 may be implemented using any suitable gateway devices, for example. Some data connection appliances 1010 access building systems 1015 via the managed networks 1020. Some building systems map to a single data connection appliance 1010. One system may map to multiple data connection appliances, and one data connection appliance may map to multiple systems. The data connection appliances reach the remote data centre over the public internet 1025, for example. The remote data centre 1005 (e.g., implemented as a server or a computer) may implement one or more portals 1030 (e.g., a communication interface software system) to which the data connection appliances connect, the data repository where the data is warehoused (e.g., in a memory or database 1035 of the data centre), and the analytics engine 1040 (e.g., a software module implemented by a processor of the data centre) that processes the data and prepares new outputs.

Although FIG. 10 shows an example of a system that can be used to implement the plurality of energy optimization strategies described above, an actual embodiment could have more or less building systems, and more or less data connection appliances, as the needs of the particular building or campus require. The illustrated embodiment has a single physical managed network to which everything is connected. However, some buildings may feature no managed networks at all, and there may be cases with separate physical networks. There may be cases with more than one connection out to the public internet from the building or campus. The data centre may be located inside the building or campus. The data centre in may be independent of the location of the building(s) being managed. The number, arrangement, and networking of the building-side components must be tailored for each building to match the unique properties of each individual building or campus.

Figure 5:
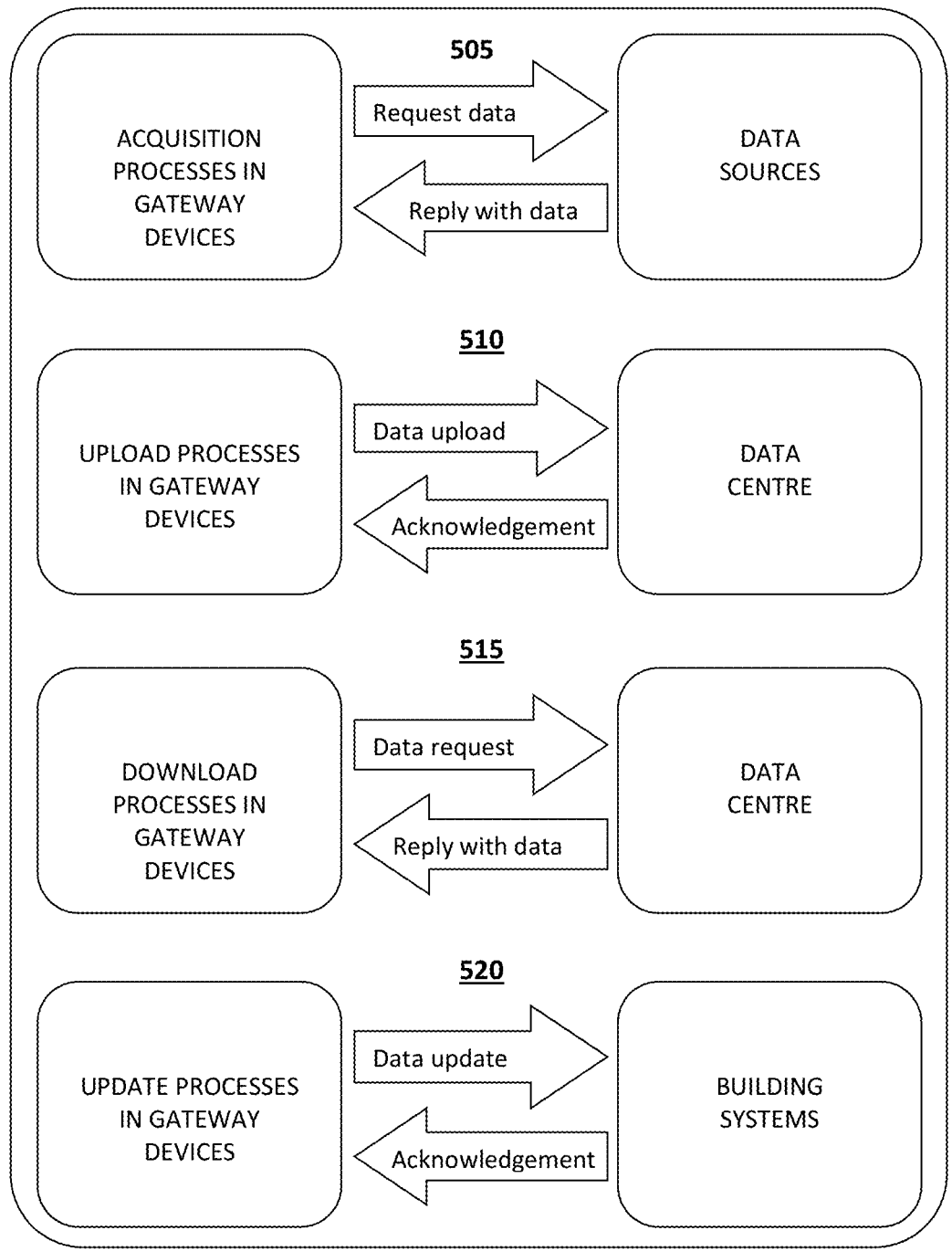
FIG. 5 shows an example of a data transfer process.

The data connection appliances are gateway devices that facilitate the exchange of data between the building systems and the data centre. All connections to the data centre may be initiated by the gateway devices inside the building. FIG. 5 illustrates the data transfer process. At 505, the gateway devices initiate data requests from various data sources, and the data sources reply to the gateway devices with the requested data. The gateway devices may timestamp data received in response to these requests. At 510, the gateway devices initiate communication with the data centre to relay the received information to the data centre, and the data centre responds to the gateway devices with an acknowledgement of receipt of data. A separate process may be used for the communication with each data source. At 515, the gateway devices also initiate requests for data from the data centre, and the data centre replies to the gateway devices with the requested data. At 520, the gateway devices initiates communication with the systems in the building to write these data values to the building systems, and the building system responds with an acknowledgement of receipt of data. A separate process for each building system may be used.

The data connection appliances monitor for a connection to the data centre. When that connection has been lost for more than a certain period of time (e.g., over 10 minutes or more), the data connection appliances will detect a lost connection condition and return the building systems to a default state. That default state may be a predefined fixed value, the last autonomous value from the building systems, or the current value from the building systems, for example. When the lost connection has been restored, the data connection appliances will resume their normal operation of providing values to the building systems.

The analytics engine processes the data from the building or campus in the manner disclosed herein. These example methods reduce the energy use of the building to the minimum or near minimum required to cost-effectively run the building according to its operational requirements. The example methods receive the incoming values and determine the set of outputs for the building systems to use. Analysis of the data set allows the methods to have up-to-date information about the characteristics and behaviour of the building to make the best decisions about how to operate.

Users can also access the data centre (e.g., over the public internet) to update information about planned use of the spaces in the buildings, to adjust the specified requirements for a given space, or to observe the performance of the building or campus.

FIG. 11 is a plot showing a comparison between the live detection and diagnostics method according to an embodiment of the present disclosure and traditional diagnostics methods. The plot shows the progression of two values associated with an underlying device over time: the input that begins in the range of 20-30, and the output that begins in the range of 80-90. As the underlying device starts to degrade, the input is adjusted upwards from the normal range of 20-30 until it reaches a maximum of 100. Once the input has reached the maximum, the output can no longer be maintained and begins to drop. In the usual system, the degradation is not detected and no indication is given that there is a problem until the output falls below a threshold. The method of the present disclosure identifies the problem before the output begins to fail by indentifying that the input has gone outside the usual range for the given output. By constantly monitoring various processes in the building, the present disclosure is able to distinguish between usual inputs and unusual inputs. When an unusual input is detected, the system compensates to maintain output, but the unusual input may signal an impending equipment failure. Accordingly, the method signals an alarm at this point, before the potential failure occurs. By contrast, traditional diagnostics methods signal an alarm only when there is a problem, e.g., the output has failed.

The live detection and diagnostics method according to an embodiment of the present disclosure uses the history of the parameters associated with the underlying device to establish what is the usual range of the input value for a given output value. By comparing the present input with the historical input to the device that maintained the equivalent output, this method can identify that the input is within the normal range or outside the normal range for the given output. A number of numerical methods may be used to define the upper and lower limits of the range. In one example embodiment, the system computes the mean and standard deviation of the inputs that have produced this output in the past and calculates the number of standard deviations that the current input is from the mean. When the input is more than 1.96 standard deviations from the mean, the system identifies this output as being outside the normal range. Other numerical methods such as linear regressions, inverse distance weighting, Kalman filtering, digital signal processing, etc., may be used.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

What is claimed is:

1. A system for reducing energy use in buildings, the system comprising:
a data centre connected to receive data from one or more building systems of a building, the data centre comprising a processor configured to:
receive source data from at least one of: the one or more building systems and one or more external sources;
calculate, from the source data, a predicted space requirement and predicted energy performance of the building;
apply a plurality of energy optimization strategies to the source data, the predicted space requirement, and the predicted energy performance to determine a set of proposed output values for each energy optimization strategy, independently of each other, wherein each set of proposed output values includes at least one equipment set point based on the predicted space requirement and the predicted energy performance for a present time and for a future time;
resolve any conflicts between the sets of proposed output values determined for the plurality of energy optimization strategies, to generate a set of harmonized output values that yields a least amount of energy that meets a minimum total energy required for the building at the present time and the future time; and
transmit the set of harmonized output values to one or more building control systems;
the one or more building control systems being controlled by the system to set at least one equipment set point in accordance with the set of harmonized output values.

2. The system of claim 1 wherein the processor is configured to perform calculations in accordance with and for each of the plurality of energy optimization strategies using the source data including at least one of: equipment configuration information, upcoming space requirement for the present time, predicted space requirement for the future time, utility price information, historical data, or weather forecast.

3. The system of claim 2 wherein the processor is configured to resolve conflicts between the sets of proposed output values determined for the plurality of energy optimization strategies by:
rejecting any value in the sets of proposed output values that would result in an operational requirement not being met anywhere in the building;
rejecting any value in the sets of proposed output values that would contravene operational requirements of any equipment in the building;
determining the minimum total energy required for the building at the present time and at the future time; and
producing the set of harmonized output values that yields the least amount of energy that meets the minimum total energy required for the building at the present time and the future time.

4. The system of claim 3 wherein the processor is configured to determine the minimum total energy required for the building at the present time and future time, using at least one of: the scheduled space requirement for the present time, scheduled space requirement for the future time, weather observations, weather forecasts, current conditions in the building spaces and equipment, historical conditions in the building spaces current and forecast building requirements, predefined space and equipment limits, or static values from engineering analysis.

5. The system of claim 1 wherein the processor is configured to apply an energy optimization strategy to optimize a ratio of fresh air and return air in an air handler by:
receiving multiple dry bulb temperature values, wet bulb temperature values, and dew point temperature values;
comparing the dry bulb temperature values relative to each other, the wet bulb temperature values relative to each other, and the dew point temperature values relative to each other, to classify a set of proposed values from the multiple sets of proposed values as being one of a plurality of pre-defined cases;
calculating an optimized mixture of fresh air and return air for the air handler according to a set of rules defined for the one of a plurality of pre-defined cases; and
setting the ratio of fresh and return air in the air handler to be the optimized mixture of fresh and return air.

6. The system of claim 1 wherein the processor is configured to apply an energy optimization strategy, on a subset of source data representing the present time and the predicted energy performance representing the future time, to coordinate static pressures of zones in the building by:
monitoring forces affecting pressure and air flow between zones in the building;
making adjustments to static pressures of one or more zones affected by changes in the forces, such that building operational requirements continue to be met; and
making corresponding adjustments to zones associated with the one or more zones affected by changes in the forces.

7. The system of claim 1 wherein the processor is further configured to detect and diagnose potential equipment failure by:
monitoring a plurality of processes in the building;
detecting abnormal input to a building system based on an analysis of the plurality of processes in the building; and
signaling an alarm regarding potential failure of one or more pieces of equipment in the building.

8. The system of claim 7 wherein the analysis of the plurality of processes in the building comprises examining current and past behaviour of the plurality of processes in the building and considering operating requirements for each of the plurality of processes in the building.

9. The system of claim 1 wherein the processor is further configured to:
monitor performance of the one or more building systems to detect any equipment problems; and
after an equipment problem is detected in an affected building system, perform self-repair on the affected building system.

10. The system of claim 1 wherein the processor is configured to use a balance temperature of the building and weather forecast for calculating the predicted energy performance of the building.

11. The system of claim 1 wherein calculation of the predicted performance of the building is performed based on:
schedule information including mode of each space at the present time and the future time;
information about the service requirements of each mode of use of each space in the building; and
ramp limits information about each equipment in the building.

12. The system of claim 1 wherein the source data comprises at least one of:
predicted heating and cooling requirement;
weather forecast;
utility rates; and
sensor parameters of at least one of:
fresh air volume;
temperature;
humidity;
pressure;
airflow;
damper position; and
variable frequency drive.

13. A method for reducing energy use in a building, the method comprising:
receiving, at a data centre, source data from at least one of: one or more building systems of the building and one or more external sources, the data centre being connected to receive data from the one or more building systems;
calculating, from the source data, a predicted space requirement and predicted energy performance of the building;
applying a plurality of energy optimization strategies to the source data, the predicted space requirement, and the predicted energy performance to determine a set of output values for each energy optimization strategy, independently of each other, independently of each other, wherein each set of proposed output values includes at least one equipment set point based on the predicted space requirement and the predicted energy performance for a present time and for a future time;
resolving any conflicts between the sets of proposed output values determined for the plurality of energy optimization strategies, to generate a set of harmonized output values that yields a least amount of energy that meets a minimum total energy required for the building at the present time and the future time; and
controlling one or more building control systems of the building to set at least one equipment set point in accordance with the set of harmonized output values.

14. The method of claim 13 wherein performing calculations in accordance with and for each of the plurality of energy optimization strategies is done using the source data including at least one of: equipment configuration information, scheduled space requirement for the present time, scheduled space requirement for the future time, or utility price information, historical data, or weather forecast.

15. The method of claim 14 wherein resolving conflicts between the plurality of energy optimization strategies comprises:
rejecting any value in the sets of proposed output values that would result in an operational requirement not being met anywhere in the building;
rejecting any value in the sets of proposed output values that would contravene operational requirements of any equipment in the building;
determining the minimum total energy required for the building at the present time and at the future time; and
producing the set of harmonized output values that yields the least amount of energy that meets the minimum total energy required for the building at the present time and the future time.

16. The method of claim 15 wherein determining the minimum total energy for the building at the present time and future time, using at least one of: the scheduled space requirement for the present time, scheduled space requirement for the future time, weather observations, weather forecasts, current conditions in the building spaces and equipment, historical conditions in the building spaces current and forecast building requirements, predefined space and equipment limits, or static values from engineering analysis.

17. The method of claim 13 wherein the plurality of energy optimization strategies includes a method of optimizing a ratio of fresh air and return air in an air handler by:
receiving multiple dry bulb temperature values, wet bulb temperature values, and multiple dew point temperature values;
comparing the multiple dry bulb temperature values relative to each other, comparing the wet bulb temperature values relative to each other, and comparing the multiple dew point temperature values relative to each other, to classify a set of proposed values from the multiple sets of proposed values as being one of a plurality of pre-defined cases;
calculating an optimized mixture of fresh air and return air for the air handler according to a set of rules defined for the one of a plurality of pre-defined cases; and
setting the ratio of fresh and return air in the air handler to be the optimized mixture of fresh and return air.

18. The method of claim 13 wherein applying the plurality of energy optimization strategies includes applying an energy optimization strategy, on a subset of source data representing the present time and the predicted energy performance representing the future, to coordinate static pressures of zones in the building by:
monitoring forces affecting pressure and air flow between zones in the building;
making adjustments to static pressures of one or more zones affected by changes in the forces, such that building operational requirements continue to be met; and
making corresponding adjustments to zones associated with the one or more zones affected by changes in the forces.

19. The method of claim 13 further comprising detecting and diagnosing potential equipment failure by:
monitoring a plurality of processes in the building;
detecting abnormal input to a building system based on an analysis of the plurality of processes in the building; and
signaling an alarm regarding potential failure of one or more pieces of equipment in the building.

20. The method of claim 19 wherein the analysis of the plurality of processes in the building comprises examining current and past behaviour of the plurality of processes in the building and considering operating requirements for each of the plurality of processes in the building.

* * * * *